(12) United States Patent
Schmidt

(10) Patent No.: US 9,775,160 B2
(45) Date of Patent: Sep. 26, 2017

(54) WLAN THROUGHPUT PREDICTION

(71) Applicant: Telefonaktiebolaget L M Ericsson (publ), Stockholm (SE)

(72) Inventor: Alfred Schmidt, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 14/622,302

(22) Filed: Feb. 13, 2015

(65) Prior Publication Data

US 2015/0245358 A1 Aug. 27, 2015

Related U.S. Application Data

(60) Provisional application No. 61/943,077, filed on Feb. 21, 2014.

(51) Int. Cl.
*H04W 4/00* (2009.01)
*H04W 72/04* (2009.01)
*H04L 12/26* (2006.01)
*H04W 28/22* (2009.01)
*H04W 72/08* (2009.01)
*H04W 84/12* (2009.01)

(52) U.S. Cl.
CPC ..... *H04W 72/0486* (2013.01); *H04L 43/0888* (2013.01); *H04W 28/22* (2013.01); *H04W 72/085* (2013.01); *H04W 84/12* (2013.01)

(58) Field of Classification Search
CPC ...... H04W 72/04; H04W 88/08; H04W 76/00
See application file for complete search history.

(56) References Cited

U.S. PATENT DOCUMENTS 8,259,600 B1\* 9/2012 Dinan ................. H04L 43/0888
370/252
2003/0161341 A1\* 8/2003 Wu ..................... H04L 12/2697
370/448

(Continued)

FOREIGN PATENT DOCUMENTS

EP 2530997 A1 12/2012

OTHER PUBLICATIONS

Javier Del Prado Pavon, Sunghyun Choi, Link Adaptation Strategy for IEEE 802.11 WLAN, 2003, IEEE, 0-7803-7802-4/03, p. 1108-1113.*

(Continued)

*Primary Examiner* — Siren Wei
(74) *Attorney, Agent, or Firm* — Coats & Bennett, P.L.L.C.

(57) ABSTRACT

According to one aspect of the present disclosure, a method is implemented by a network node in relation to a basic service set (BSS) that includes an access point providing a Wireless Local Area Network (WLAN). The network node predicts a downlink data rate for downlink transmissions from the access point to a particular UE based on either signal qualities of a first set of uplink transmissions which are sent from the particular UE to the access point or a default signal quality value. The UE is either already part of the BSS or is being evaluated for admission to the BSS. The predicted downlink data rate is weighted by a metric that accounts for channel conditions of the BSS to determine a predicted downlink throughput for downlink transmissions from the access point to the particular UE. The predicted downlink throughput is used for controlling the BSS.

27 Claims, 9 Drawing Sheets

(56) References Cited

U.S. PATENT DOCUMENTS

| | | | | |
|---|---|---|---|---|
| 2006/0067256 A1* | 3/2006 | Alazraki | ............... | H04L 1/0003 370/300 |
| 2007/0153916 A1* | 7/2007 | Demircin | ........... | H04N 21/2365 375/240.26 |
| 2012/0051244 A1* | 3/2012 | Nagara | ................. | H04W 8/005 370/252 |
| 2014/0185464 A1* | 7/2014 | Yang | ..................... | G01S 5/0215 370/252 |
| 2014/0192643 A1* | 7/2014 | Kalapatapu | ........... | H04W 48/00 370/230 |
| 2014/0307552 A1* | 10/2014 | Elsherif | ................ | H04W 36/14 370/235 |

OTHER PUBLICATIONS

Pavon et al. "Link Adaptation Strategy for IEEE 802.11 WLAN via Received Signal Strength Measurement." IEEE ICC, May 2003, pp. 1108-1113.

Zhou, R. et al., "WizNet: A ZigBee-based Sensor System for Distributed Wireless LAN Performance Monitoring", 2013 IEEE International Conference on Pervasive Computing and Communications (PerCom), Mar. 18, 2013, pp. 123-131, IEEE, San Diego, CA.

Chen, C. et al., "Throughput Performance Analysis and Experimental Evaluation of IEEE 802.11b Radio Link", 2007 6th International Conference on Information, Communications & Signal Processing, Dec. 10, 2007, pp. 1-5, IEEE, Signapore.

* cited by examiner

US 9,775,160 B2

WLAN THROUGHPUT PREDICTION

RELATED APPLICATIONS

This application claims the benefit of U.S. Provisional Application No. 61/943,077, filed on Feb. 21, 2014, the disclosure of which is incorporated herein by reference in its entirety.

TECHNICAL FIELD

The present disclosure relates to Wireless Local Area Networks (WLANs), and more particularly to throughput prediction for WLANs.

BACKGROUND

When a WLAN Radio Access Network (RAN) wishes to make mobility decisions for User Equipment (UE) such as smart phones that have both WLAN Radio Access Technology (RAT) and cellular RAT interfaces, the WLAN RAN needs a prediction of performance for an individual UE in the WLAN RAN. Previous methods for predicting the throughput of an individual UE have been based on only a subset of channel impairments, and can therefore incur significant prediction error due to variations in impairments that are not included in the predictor.

In the prior art, the use of a mathematical function, $R(q)$, that maps the received signal strength indicator (RSSI) to a predicted instantaneous data rate in an idealized channel is known. This is discussed by J. Pavon and S. Choi in the article "Link Adaptation Strategy for IEEE 802.11 WLAN via Received Signal Strength Measurement," published by the IEEE in May 2013. However, this model does not take into account a variety of channel impairments.

SUMMARY

According to one aspect of the present disclosure, a method is implemented by a network node in relation to a basic service set (BSS) that includes an access point providing a Wireless Local Area Network (WLAN). The network node predicts a downlink (DL) data rate for DL transmissions from the access point to a particular UE based on either signal qualities of a first set of uplink transmissions which are sent from the particular UE to the access point, or a default signal quality value. The particular UE is either already part of the BSS or is being evaluated for admission to the BSS. The predicted DL data rate is weighted by a metric that accounts for channel conditions of the BSS to determine a predicted DL throughput for DL transmissions from the access point to the particular UE. The network node uses the predicted DL throughput for controlling the BSS.

In one or more embodiments, the metric that accounts for channel conditions of the BSS is based on an average UE DL throughput of DL transmissions from the access point to a plurality of respective UEs in the BSS. In some such embodiments, the method includes calculating the average UE DL throughput among the plurality of UEs in the BSS based on:
  a duration of each of a plurality of DL bursts transmitted from the access point to the plurality of UEs, and
  a quantity of bits transmitted in each of the plurality of DL bursts.

In one or more embodiments, the weighting of the predicted DL data rate by the metric that accounts for channel conditions of the BSS is performed as a function of an additional DL data rate which is based on signal qualities of a second set of uplink transmissions which are sent from a plurality of UEs in the BSS to the access point.

In one or more embodiments, the weighting of the predicted DL data rate by the metric that accounts for channel conditions of the BSS is performed as a function of an expected DL bit duration which is based on a signal quality of a second set of uplink transmissions which are sent from a plurality of UEs in the BSS to the access point.

According to another aspect of the present disclosure, a network node is disclosed which includes a communication interface and one or more processing circuits communicatively connected to the communication interface. The one or more processing circuits are configured to predict a DL data rate for DL transmissions from an access point to a particular UE based on either signal qualities of a first set of uplink transmissions which are sent from the particular UE to the access point or a default signal quality value. The access point provides a Wireless Local Area Network (WLAN), and is part of a basic service set (BSS). The particular UE is either already part of the BSS or is being evaluated for admission to the BSS. The one or more processing circuits are further configured to weight the predicted DL data rate by a metric that accounts for channel conditions of the BSS to determine a predicted DL throughput for DL transmissions from the access point to the particular UE, and to use the predicted DL throughput to control the BSS.

In one or more embodiments, the metric that accounts for channel conditions of the BSS is based on an average UE DL throughput of DL transmissions from the access point to a plurality of respective UEs in the BSS. In some such embodiments, the one or more processing circuits are configured to calculate the average UE DL throughput among the plurality of UEs in the BSS based on:
  a duration of each of a plurality of DL bursts transmitted from the access point to the plurality of UEs, and
  a quantity of bits transmitted in each of the plurality of DL bursts.

In one or more embodiments, the one or more processing circuits are configured to weight the predicted DL data rate by the metric that accounts for channel conditions of the BSS as a function of an additional DL data rate for the particular UE which is based on a signal quality of a second set of uplink transmissions which are sent from a plurality of UEs in the BSS to the access point.

In one or more embodiments, the one or more processing circuits are configured to weight the predicted DL data rate by the metric that accounts for channel conditions of the BSS as a function of an expected DL bit duration for the particular UE which is based on a signal quality of a second set of uplink transmissions which are sent from a plurality of UEs in the BSS to the access point.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Aspects of the present disclosure provide novel techniques for predicting DL throughput in a WLAN, and for applying that predicted DL throughput to controlling a basic service set (BSS) of the WLAN. These techniques are novel in that, rather than attempting to predict DL throughput based on only one or two aspects of performance (such as RSSI or channel utilization), they incorporate statistical measurements of recent downstream transmissions in the WLAN to improve the prediction. The statistical measurements provide insight into the achievable DL throughput taking into account all channel impairments, without having to separately measure each aspect of impairment.

Figure 1:
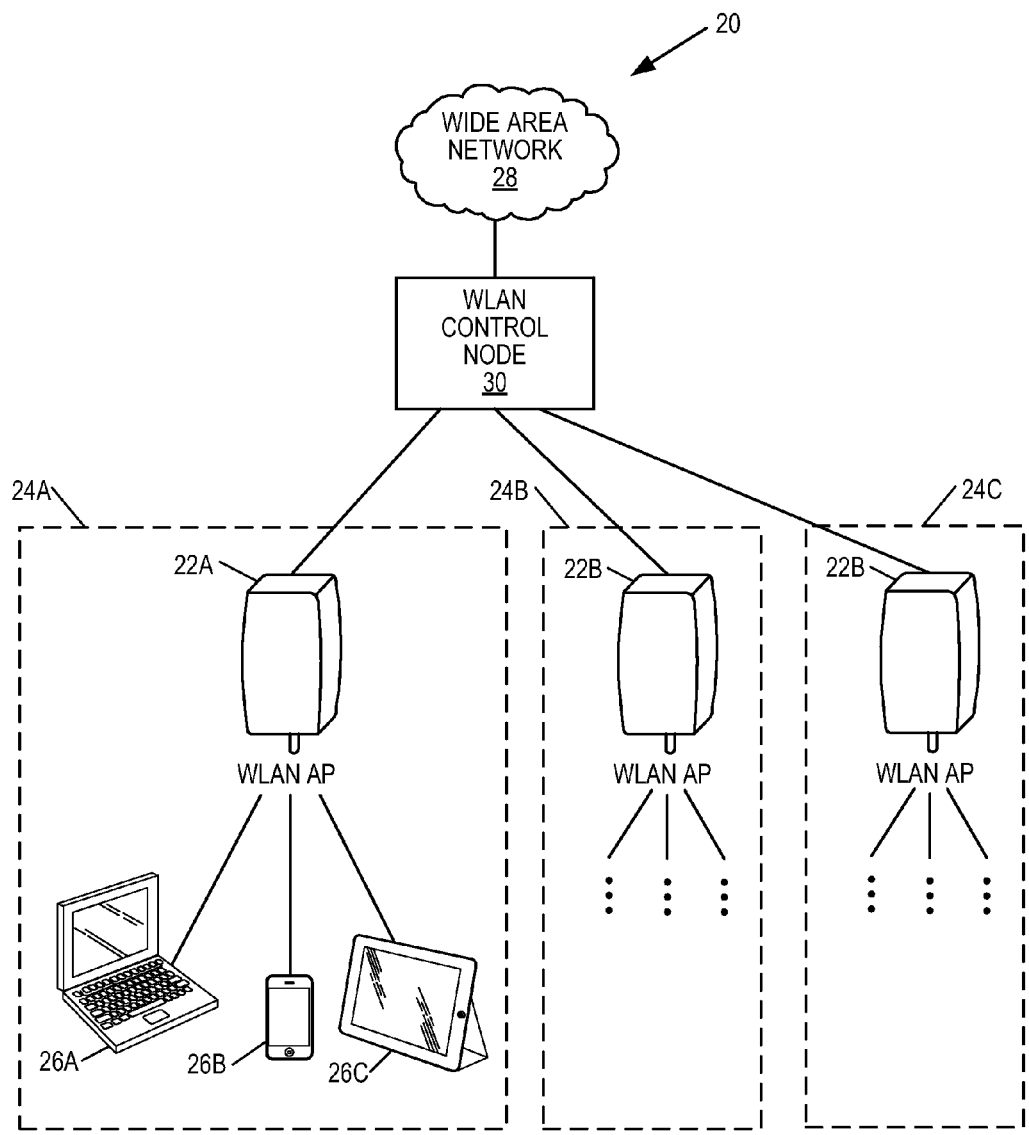
FIG. 1 illustrates an example network including a plurality of access points (APs) and user equipment (UEs).

The term "basic service set" refers to a set of user equipment (UEs) and the wireless access point (AP) to which they connect in a 802.11 Wireless Local Area Network (WLAN). FIG. 1 illustrates an example communication network 20 that includes a plurality of WLAN APs 22, each of which has their own respective BSS 24 that supports one or more UEs 26. In some embodiments, the UEs 26 may also be configured to communicate via non-WLAN networks (e.g., 3rd Generation Partnership "3GPP" cellular networks). Of course, although only three UEs are shown in the BSS 24A of FIG. 1, it is understood that a given BSS could include any number of UEs.

According to one aspect of the present disclosure, a DL data rate is predicted for DL transmissions from an AP 22 to a particular UE 26 based on either signal qualities of a first set of uplink transmissions which are sent from the particular UE 26 to the access point 22, or based on a default signal quality value. The predicted DL data rate is weighted by a metric that accounts for channel conditions of the BSS 24 to determine a predicted DL throughput for DL transmissions from the access point 22 to the particular UE 26 that is either part of the BSS 24 or is being evaluated for admission to the BSS 24. The predicted DL throughput is then used for controlling the BSS 24. This improves upon prior art throughput prediction techniques because a wide variety of channel impairments are accounted for.

According to one aspect of the present disclosure, recent statistical measurements of UE DL throughput are incorporated into predictions. This modifies the known R(q) prediction by using additional terms, such as Tb (which represents a new method for measuring average UE DL throughput), Db' (which represents a bit duration), and Rb (which represents a data rate). The DL throughput prediction methods depicted in FIGS. 8-10 below are able to account for a wide variety of types of channel impairments without having to estimate each of the impairments individually.

Referring again to FIG. 1, the various WLAN APs 22 provide connectivity to a wide area network 28 (e.g., the Internet). In some embodiments, a WLAN control node 30 is present and controls operation of the various WLAN APs 22 and their BSSs 24. The UEs 26 may be a cellular telephone, smartphone, personal digital assistant (PDA), tablet computer, laptop computer, laptop embedded equipment (LEE), laptop mounted equipment (LME), USB dongle, or any other device equipped with 802.11 (i.e., Wi-Fi) based wireless communication capabilities. Some UEs may also have radios for connecting to non-WLAN radio access networks (RANs), such as 3GPP RANs, 3GPP2 RANs, or WiMAX RANs.

The predicted DL throughput for a particular UE may be used for a variety of purposes, such as determining whether to admit or deny the particular UE or selected ones of its traffic flows to the BSS. It may be desirable, for example, to admit data flows but deny voice flows of a given UE, (e.g., if QoS requirements of the voice flow could not be accommodated). Such traffic steering could be based on QoS requirements of the particular UE and/or QoS requirements of its particular traffic flows.

Figure 2:
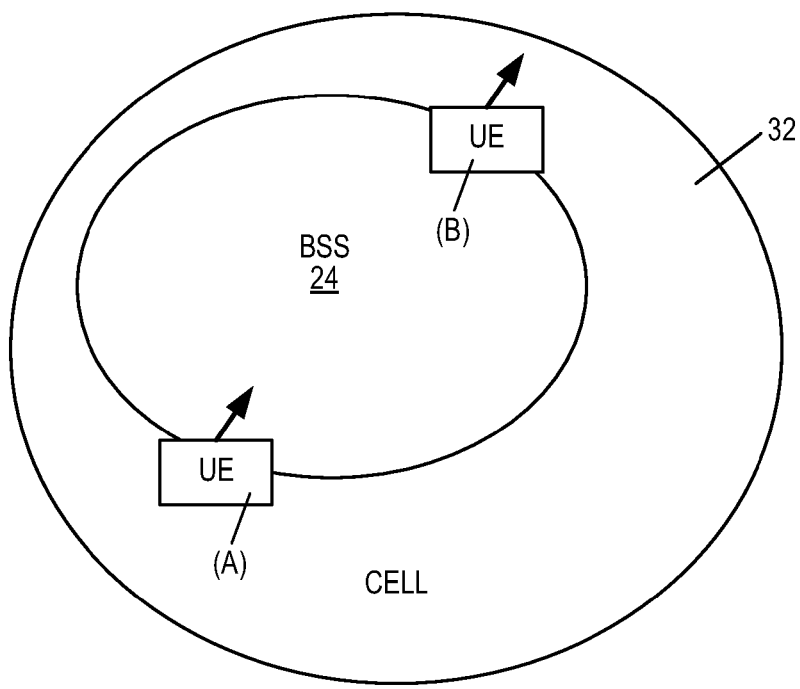
FIG. 2 illustrates example UE locations at which DL throughput predictions could be useful.

FIG. 2 illustrates some example UE locations within the coverage area of an example BSS 24 at which DL throughput predictions could be useful to decide when to switch service from the 3GPP RAN of cell 32 to the BSS 24, or vice versa, based on comparison of the predicted DL throughput from each network. At location "A", the UE is in an area of cellular coverage and moving into the edge of coverage for the BSS 24. As the UE moves far enough into the BSS 24, the DL throughput prediction from the BSS 24 should at some point exceed the expected DL throughput for the cell 32, at which time handover to the BSS 24 would likely be desirable. At location "B", the UE is moving to an area of lower predicted DL throughput from the BSS 24. At some point, the BSS 24 DL throughput prediction will be lower than the predicted DL throughput from the cell, at which time handover to the cell 32 would likely be desirable. The DL throughput prediction techniques discussed above could be used to determine how to handle the presence of UE 26A in the BSS 24, and optionally also the departure of UE 26B from the BSS 24. It should be noted that these comparisons of predicted DL throughput could be applied for handover decisions between any WLAN BSS and one or more overlapping cells of any RAN, such as another WLAN BSS within the same RAN, another WLAN BSS in a different RAN, a cell in a 3GPP RAN, a cell within a 3GPP2 RAN, or a cell within a WiMAX RAN.

In addition to admission control, the DL throughput prediction could also be used for traffic overload control by deciding whether to release the particular UE or selected ones of its flows from the BSS 24 based on the DL throughput prediction. The DL throughput prediction could also be used for mobility control (e.g., load balancing), and performance monitoring of the network (e.g., for longer term changes that are implemented after the particular UE is no longer connected and/or no longer trying connect to the BSS). Specific details of a variety of DL throughput prediction methods will now be discussed in detail.

Overview of WLAN Performance

The measure of UE performance will be a prediction of the downlink (DL) throughput of unicast data frames, i.e., the user throughput from the 802.11 access point (AP) 22 to the particular UE 26. Uplink (UL) throughput will be ignored. In IEEE 802.11 terminology, UL is also referred to as "upstream" (US), and DL as "downstream" (DS), however, UL and DL will be used in the discussion below. This simplification of UE performance being a prediction of DL throughput of unicast data frames is made to allow a simpler comparison with other RATs, and because the majority of user traffic often occurs in the DL direction. The DL throughput in a WLAN can be affected by many factors, such as:

- Transmit power, antenna gain, path loss, and fading due to multipath and Doppler shifts (together, these determine the signal-to-noise ratio (SNR) at the receiver);
- Contention with other WLAN stations on the same frequency channel (co-channel). These contending stations may be in the same BSS, i.e., served by the same AP, or in a nearby BSS, i.e., served by a different AP, or in an independent BSS, i.e., direct communication between stations without an AP;
- Contention from other WLAN stations that are operating on a different but overlapping frequency channel (adjacent channel interference);
- Non WLAN interference sources, such as microwave ovens, Bluetooth devices, and cordless phones that do not observe the same collision avoidance mechanisms as in 802.11.

Co-channel contention can affect throughput in two main ways depending on whether the transmitting station (STA) (i.e., UE or AP) senses the transmission from the contending station. As used herein, STA refers to either an 802.11 UE or an 802.11 AP. The two ways in which co-channel contention can affect throughput are:

- Transmission deferral: If the transmitting 802.11 station (STA) hears the contending STA, the transmitting STA will defer its transmission until it senses that the channel is clear. When the channel is clear, the transmitting STA uses a randomly chosen back-off time to further delay its transmission attempt, in order to reduce the probability of colliding with other contending STAs. Transmission deferral reduces throughput by reducing the amount of time that the transmitting STA can access the channel.
- Collisions: If the transmitting STA does not hear the contending STA, the transmitting STA may attempt to transmit at the same time as the contending STA. The resulting collision causes a decrease in the signal-to-interference plus noise ratio (SINR) at the receiving STA for some or all of the transmission time. This reduction in SINR reduces the instantaneous data rate that can be transmitted successfully, and often causes a frame error, since the transmitting STA is not aware of the collision a priori.

A co-channel collision may also occur when a contending STA is not able to properly decode the network allocation vector (NAV) that reserves the channel for an ongoing transmission and its ACK. As a result, the STA may think that the channel is clear prematurely and attempt a transmission that collides.

Adjacent channel interference and other noise sources impact throughput in similar ways. If the interference is bursty, it will interfere with some of a STA's transmissions, thereby decreasing the SINR of those transmissions. The resulting increase in frame error rate may cause the rate adaptation algorithm to select lower data rates.

If the interference is persistent, the decrease in SINR will also persist, and the rate adaptation algorithm may persistently select lower data rates. In addition, when the transmitting STA senses that the noise floor is higher, it may reduce its receiver sensitivity. As a result, the STA will not be able to receive ACKs from other STAs if the received signal strength is not high enough to be received by the de-sensitized receiver.

Traffic Steering

Network based traffic steering is envisaged to occur at two points in time:

WLAN entry: When the UE attempts to enter a WLAN, it will be in one of two conditions:
- BSS edge: If the UE moved into the BSS coverage area from outside that area, and it did not have service from another RAT, the UE will attempt to enter the WLAN at the edge of the coverage area. The signal strength will be low at that location, and therefore the achievable data rate will be low.
- Anywhere in the BSS: This case occurs if the UE was previously being serviced by another RAT (either Idle or Connected depending on whether data was ready for transmission), and the signal quality from that RAT dropped low enough to trigger the UE to search for an alternate RAT such as WLAN. Alternatively, the UE may have just enabled the WLAN interface, e.g., due to power-on, or due to the user enabling the data service. In this case, the UE may be anywhere in the coverage area, so the signal strength would correspond to the location relative to the AP.

If the UE attempts entry at a location with low signal strength, or the BSS performance is reduced due to contention or interference, the network could attempt to defer admission into the WLAN until the predicted performance in the WLAN is deemed to be better than the quality of the overlapping RATs.

WLAN departure: After admission to the BSS, the UE may move around within the coverage area to a location with poorer link quality, or the loading of the BSS may increase leaving fewer resources for the UE. Performance predictions are needed in these situations to allow the network to steer the UE to a RAT that can offer better UE performance.

It may be desirable to deny admission to a BSS in a way that causes a UE to defer its access attempt. Ideally, the network should be able to defer the UE in a way that causes it to re-attempt access after a long enough pause that the path loss or channel loading has had a chance to change significantly, e.g., 5 seconds. These periodic transmissions would allow the network to monitor changes in the UE's WLAN link quality, so that the UE can be admitted when the quality is high enough.

In order to compare predicted performance between RATs, the network needs to establish a mapping between the UE identifiers used in each RAT. In WLAN, the identity of a transmitting STA is indicated by the source medium access control (MAC) address in the 802.11 frame. To map this identity to the other RATs, the network needs to determine a mapping from the MAC address to the UE's identity within 3GPP, e.g., the international mobile station identifier (IMSI). For traffic steering in Wideband Code Division Multiple Access (WCDMA) networks, for example, the network could learn the IMSI from the Authentication, Authorization, and Accounting (AAA) server during the extensible authentication protocol (EAP) authentication phase. During this phase, the UE exchanges EAP messages over the 802.11 radio link, and correspondingly, the AP exchanges EAP messages with an AAA server, e.g., using remote authentication dial-in user service (RADIUS) protocol.

Performance Predictions

Several aspects of WLAN performance could potentially be predicted by an AP 22 for the purpose of controlling the BSS 24 (e.g., for traffic steering). Two possible types of predictions include:

UE specific predictions, which predict the instantaneous throughput of a specific UE; and BSS wide predictions, which predict the UE throughput averaged over all UEs in the WLAN cell (i.e., the BSS).

UE specific predictions are useful for mobility decisions that attempt to optimize the performance of the individual UE, since they allow the mobility decision to be tailored to the UE's current channel condition. In this regard, the term "mobility" refers to a change in the primary packet service path from one RAT to another. It does not imply that the UE can report measurements of a target RAT to a source RAT, as is usually the case with 3GPP handovers. In contrast, BSS wide predictions are more useful for load balancing decisions, where we wish to balance the "average" UE experience between RATs that overlap, regardless of an individual UE's experience.

One basis for selecting a best RAT could be a comparison of UE specific throughput predictions in each RAT, e.g.:

$$RAT = \arg\max\{R_i(SINR_i) \times (1-util_i)\} \quad \text{equation (1)}$$

where:

$R_i$, $SINR_i$, and $util_i$ are the data rate, SINR, and total resource utilization in RAT i.

The following is a short list of potential UE-specific measurements that could be made by an AP 22 to predict DL throughput:

UL RSSI
   For some chipsets, such as the QUALCOMM ATHEROS chipset in ERICSSON APs (and also likely in other chipsets), the RSSI is actually an estimate of the received signal strength relative to an estimated noise floor power. So, in some embodiments, the RSSI is an estimate of SNR, rather than an estimate of the absolute signal strength. The reported RSSI in such embodiments is equal to: fixed_noise_offset+ SNR_estimate, where the fixed_noise_offset is typically −95 dBm. In other embodiments, the measured RSSI value could be an estimate of absolute signal strength.

DL user plane throughput of recent transmissions
   This would involve measuring DL throughput on a per UE basis.

DL frame error rate statistics per transmission rate.
   In ERICSSON APs, for example, the Minstrel rate adaptation algorithm that is used maintains statistics about the probability of frame transmission error for each of the transmission rates, based on previous attempts to use those rates, and periodic polling of other rates.

The following is a short list of potential BSS wide measurements that could be made by an AP to predict DL throughput:

UE DL throughput averaged over all UEs

Channel availability
   This is a measure of the percentage of time that the channel is not busy.
   The busy times could be further categorized into:
      AP transmission time, including MAC layer ACKs
      AP reception time for frames addressed to the AP
      Busy time for 802.11 frames outside the BSS, i.e., where the AP is neither source nor destination
      Busy time for non 802.11 energy, which includes 802.11 transmissions that could not be decoded, e.g., transmissions on overlapping channels, or where the SINR was insufficient to decode the 802.11 header properly.

AP transmission efficiency, which is defined as the ratio of successful transmissions to total transmissions on the basis of transmission time, i.e., this is a measurement of transmission error time duration, rather than packet error rate.

Noise floor
   This is a measure of the background noise level when no bursty transmission sources are present on the channel.

"Phy error" rate
   In WLAN, a "phy error" refers to a false detection of a frame preamble. A phy error causes the transmitter to erroneously think that the channel is busy.

Modulation and coding scheme (MCS) statistics showing the distribution of Tx and Rx rates that were used in the BSS UE Association States Performance predictions are needed while the UE is in different states of association to the BSS:

Disassociated and attempting to associate
   This state exists either before the UE 26 has associated with the BSS 24 for the first time, or after the network has commanded the UE 26 to disassociate from the BSS 24. When the UE is attempting to associate, it will transmit one or more management frames to the AP (e.g., probe request, authentication request, or association request) that allow the AP to know that the UE is in the coverage area. The AP can use the RSSI of these received frames to predict the instantaneous DL throughput that the UE might get in the WLAN. Scenarios:
      UE connected in a 3GPP RAT moves into WLAN coverage
         There may exist different triggers within the UE that cause the UE to search for WLAN service. For example, the UE may perform a periodic search for WLAN coverage even while in good 3GPP signal conditions. As another example, the trigger may be conditioned on the UE having data ready to send. The trigger will determine the likelihood of having a UE initiate a WLAN association as soon as BSS coverage is available, i.e., at the edge of the BSS, versus locations that are more distributed throughout the BSS area. If it is always at the cell edge, then it is even more valuable to find a way to defer the UE's entry until it has a better WLAN signal quality.
      UE idle in 3GPP moves into WLAN coverage
         In this case, the UE would be monitoring 3GPP signal quality (as part of idle state channel selection), but the 3GPP network would not have an instantaneous measure of signal quality. As in the previous scenario, it could be useful to know whether the UE always searches periodically for WLAN coverage, or only when it has data to send.

Associated and active
   The associated state exists after the UE has associated with the BSS. If the UE recently exchanged traffic in the BSS (i.e., it was active), the recent traffic history could be used to predict the instantaneous DL throughput of the UE.

Associated and inactive
   The AP does not distinguish this state from the previous state (associated and active). A UE may remain associated for a long time without exchanging traffic, since the inactivity timeout for removing associations is usually very long, e.g., on the order of hours rather than seconds. Therefore, measurements of UE specific DL throughput could be very stale and inaccurate. Note that the WLAN does not use the concept of a radio resource control (RRC) Connection that is used in 3GPP RATs, since there are no physical radio resources dedicated to an associated STA. Options to deal with this inactive substate are:

Use the latest individual UE DL throughput measurement, even though it is stale.

Revert to using the BSS wide average UE DL throughput measurement.

Although management frames are specifically discussed above, it is understood that other types of frames (e.g., control frames and/or data frames) also indicate that the UE is in a coverage area, and it is understood that an AP could use the RSSI of such frames in addition to, or as an alternative to, the RSSI of the management frames to predict UE DL throughput.

Average UE DL Throughput Measurements

One option for predicting average UE DL throughput (averaged over all UEs in the BSS) is described below. During each sampling interval, n, the AP 22 calculates an instantaneous DL throughput per UE as:

$$T(n)=B(n)/U(n)/(\text{sampling\_period}) \quad \text{equation (2)}$$

where:

B(n) is the number of traffic bits transferred successfully on the DL during sampling interval n, U(n) is the number of STAs (UEs) to which the traffic bits were sent during sampling interval n, T(n) is the estimated instantaneous DL throughput per UE in sampling interval n, and sampling_period is the time between sampling intervals.

The sampling period, i.e., the time between successive sampling intervals, could be chosen to be small (e.g., 1 second) in order to reduce the inaccuracy introduced by assuming that all U(n) stations have data queued for the whole sampling period.

Next, these instantaneous DL throughput samples, T(n), could be smoothed by averaging them over a longer AP reporting interval, e.g., on the order of 60 seconds. This averaged DL throughput could be calculated by only including sampling intervals where B(n) and U(n) are non-zero. If B(n) and U(n) are zero for all sampling intervals, a nominal DL throughput could be reported. The AP could report this average UE DL throughput to the WLAN control node 30 every AP reporting interval.

The WLAN control node 30 could perform a second stage of smoothing by averaging the reported DL throughput measurements with a rectangular sliding window over the most recent reports, e.g., the 15 most recent reports. For example, with a sampling period of 1 second, an AP reporting interval of 60 seconds, and a second stage smoothing window of 15 reports, the result would be an estimate of average UE DL throughput over the most recent 15 minutes.

The resulting 15 minute DL throughput estimate may be inaccurate since:

It does account for sampling intervals when traffic is queued for a UE but no traffic could be transmitted to the UE during the sampling interval, e.g., due to channel contention, or queuing behind other UEs.

It assumes that traffic is queued for each of the active UEs for the duration of the sampling interval. For example, a typical 100 Kbyte web page lasts only 16 ms at a transmission rate of 50 Mbps. If an AP transmits a 100 Kbyte burst in 16 ms, and then no more data is queued for the UE for the remaining 984 ms of the sampling interval, the estimated DL throughput for that 1 second sampling interval would be only 0.8 Mbps, rather than the 50 Mbps that the UE actually experienced.

It may be possible to reduce the error by averaging the DL throughput only over the portion of the sampling period when the channel was busy. So, extending the example above, if the channel is busy for 100 ms of the 1 second sampling period (16 ms for the AP's transmissions and 84 ms due to activity by other STAs), the AP could use the 100 ms busy period to calculate the DL throughput as 8 Mbps (=100 Kbytes/100 ms). This would be a more accurate estimate, but still somewhat pessimistic in that it assumes that each UE had data queued for the entire busy time.

Improved Average UE DL Throughput Estimate

It may be possible to improve the accuracy of the average UE DL throughput estimate further, at the expense of more processing in the AP. One way to improve the estimate is to measure the duration of each UE data burst, and the number of bits transferred in the burst. This could be implemented by adding a set of timestamps and bit counters:

Per UE burst duration counter, Db(u,i), where u is a UE index and i is the burst index burst bit counter, Bb(u,i)

Per AP time duration counter, Db bit counter, Bb

The operation of the estimator can be explained as follows. Assume that all of a UE's queues are initially empty. When any one of the UE's DL queues goes from empty to non-empty, the AP records a per-UE timestamp, Dbstart(u,i), to indicate the start of a data burst. At the same time, it initializes the UE's data burst bit counter, Bb(u,i), to zero. While at least one of the UE's queues still contains data, the AP increments the UE's bit counter by the number of bits transmitted for each successful frame transmission. When all of the UE's queues become empty (i.e, the end of the data burst), the AP calculates the duration of the data burst, Db(u,i), as the difference between the current time, Dbend (u,i), and the time at the start of the burst, Dbstart(u,i). The DL throughput, Tb(u,i), experienced over data burst i is then just the ratio of the number of bits transmitted during the burst, Bb(u,i), to the duration of the data burst, Db(u,i), i.e., $$Tb(u,i)=Bb(u,i)/Db(u,i) \quad \text{equation (3)}$$

The DL throughput estimate of an individual UE, u, can be improved by averaging the estimates over a longer observation interval, I, to get:

$$Tb(u, I) = \frac{\sum_{i \in I} Bb(u, i)}{\sum_{i \in I} Db(u, i)} \quad \text{equation (4)}$$

For estimating the DL throughput of the entire BSS, it is sufficient to accumulate the per-UE bit counters and duration counters into the AP wide counters (Bb and Tb) that sum over all UEs and all data bursts in the BSS over interval I. Then at the end of observation interval I, an average UE burst DL throughput, Tb(I), over the interval can be calculated simply as:

$$Bb(I)=\Sigma_{i \in I, \text{all } u}Bb(u,i) \quad \text{equation (5)}$$

$$Db(I)=\Sigma_{i \in I, \text{all } u}Db(u,i) \quad \text{equation (6)}$$

$$Tb(I)=Bb(I)/Db(I) \quad \text{equation (7)}$$

Note that this method properly accounts for times when multiple UEs have data queued, since the time accumulator, Db(I), sums the time that each UE is waiting with data in its queues. As a simple example, if two UEs have data queued for an entire observation interval (e.g., 10 seconds), and the AP successfully sends 100 Mbits to each UE, the estimated average UE burst DL throughput would be:

$$Tb(I)=(100\text{ Mbits}+100\text{ Mbits})/(10\text{ seconds}+10\text{ seconds})=10\text{ Mbps}$$

The estimate includes both queuing delay (time waiting in the queue) and scheduling delay (time waiting for media access, retransmissions, and ACKs).

UE Specific DL Throughput Prediction Upon Entry into BSS

When a UE decides to look for a WLAN BSS, it exchanges a sequence of management and control frames with the AP. The management and control frames that the UE sends (probe request, authentication request, association request, and ACK) are usually sent at a fixed, low data rate (e.g., 1 Mbps in the 2.4 Mbps band) in order to achieve a high probability of successful transmission. Since the data rate is not adaptive at this point, it does not provide an indication of link quality. However, the AP can measure the RSSI of the frames that it receives from the UE and use the RSSI as an indication of link quality. Next we consider how the UL RSSI can be mapped to a prediction of the DL throughput.

Figure 3:
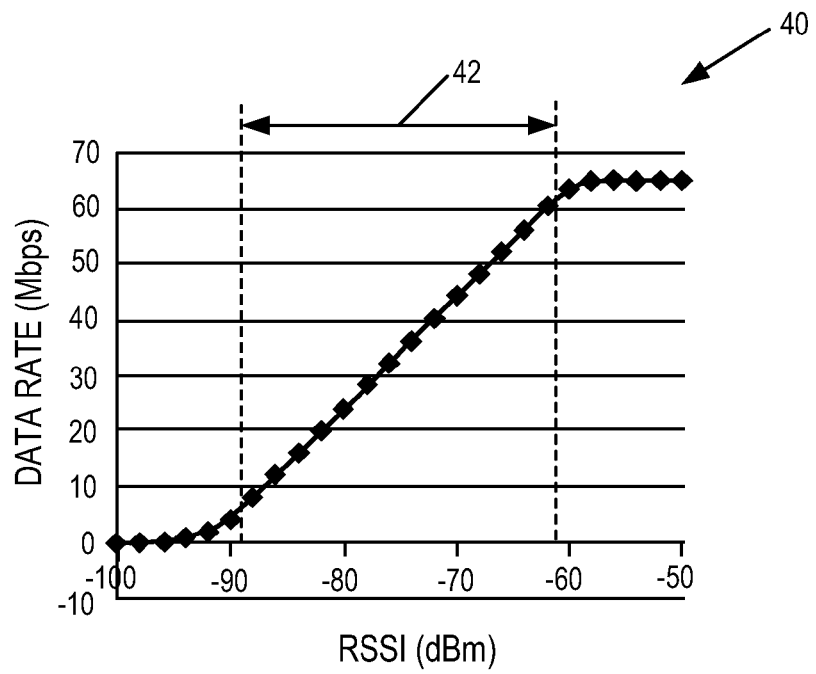
FIG. 3 illustrates an example histogram of signal quality values.

In the absence of interference and collisions, it is possible to relate the UL RSSI to the instantaneous data rate that can be used by the UE in the UL direction. This is possible since the RSSI that is reported by some current WLAN chips is really an estimate of SNR, plus fixed offset of, e.g., about −95 dBm, rather than the absolute received signal strength. This relationship could be measured or predicted a priori, and could look something like the function 40 shown in FIG. 3. The middle range 42 of the chart 40 in FIG. 3 is approximately linear. In this example, the data rate function could be approximated by the continuous function:

$$R(q) \sim = 2*(q+92) \qquad \text{equation (8)}$$

over the range −90<q<−62
where: q is the UL RSSI.

Alternatively, the data rate function could be approximated by any other continuous function, such as a polynomial equation.

As yet another alternative, the function shown in chart 40 of FIG. 3 could be quantized and implemented as a look up table. To create the look up table, the independent variable, q, would be divided into discrete bins. For example, the histogram could use RSSI bins of size 1 dBm and then quantize the measured signal quality values (e.g., RSSI values) into the 1 dBm bins.

The actual data rate function will depend on the fading characteristics of the channel, but as a first approximation, the fading dependence could be ignored. The data rate function will also depend on the number of spatial multiplexing streams that can be transmitted. Since the rank of the channel would not be known when the UE first enters the BSS, we could assume the use of a single stream (rank 1), since most handsets today are limited to single stream operation.

Most UEs have an equivalent isotropically radiated power (EIRP) that is significantly less than the AP's EIRP. In the 2.4 GHz band, a typical UE has an EIRP of about 14 dBm, though the UE may use a slightly lower EIRP at higher data rates in order to limit out-of-band interference. The EIRP at the AP is configurable and is usually higher than the EIRP of the UE. To relate the UL RSSI to the DL RSSI, one could make the following assumption about the difference in transmitted power at the AP and UE:

$$RSSI_{DS}=(S_{DS}-S_{US})+RSSI_{US} \qquad \text{equation (9)}$$

where:
$S_{DS}$ is the transmitted power at the AP's antenna port
$S_{US}$ is the transmitted power at the UE's antenna port A typical UE has a single transmit chain with a conducted output power of about 15 dBm, while an ERICSSON AP typically uses 3 transmit chains with a conducted output power of about 18 dBm per chain, giving a total power difference of about 8 dB. Since the AP knows its transmitted power, variations in the AP transmit power could be accounted for. But since the UE transmit power is not known, it could be assumed.

This difference in transmitted power has limited impact, since most successful DL transmissions require a successful ACK transmission in the UL. The 802.11 standard specifies the data rate at which an ACK is sent, as a function of the data rate used for the original frame. For example, using the single stream IEEE 802.11n rate set for a 20 MHz bandwidth, the rules for selecting an ACK data rate in response to a data frame data rate are as follows:

TABLE 1

| MCS Index | Data frame data rate with 800 ns guard interval (Mbps) | ACK control frame data rate (Mbps) |
| --- | --- | --- |
| 0 | 6.5 | 6 |
| 1 | 13.0 | 12 |
| 2 | 19.5 | 12 |
| 3 | 26 | 24 |
| 4 | 39 | 24 |
| 5 | 52 | 24 |
| 6 | 58.5 | 24 |
| 7 | 65.0 | 24 |

Since the ACK is transmitted at the UE's transmitted power, the DL data rate will be limited by the data rate required for the ACK transmission on the UL. Using the example above with single stream IEEE 802.11n at 20 MHz bandwidth, if the UE's power causes the UL data rate to be limited to 12 Mbps, the DL data rate would be limited to 19.5 Mbps. As a first approximation, the DL RSSI could be assumed to be equal to the UL RSSI for the purpose of predicting usable data rate. Alternatively, the estimated DL RSSI could be adjusted according to the current output power setting of the AP relative to an assumed UE transmit power.

Now, to translate the DL data rate prediction into a DL throughput prediction, contention and interference from other sources in the BSS should be accounted for. Two possibilities are to take advantage of measurements of either the channel utilization, or the average UE DL throughput.

Weighted Channel Utilization

Figure 4:
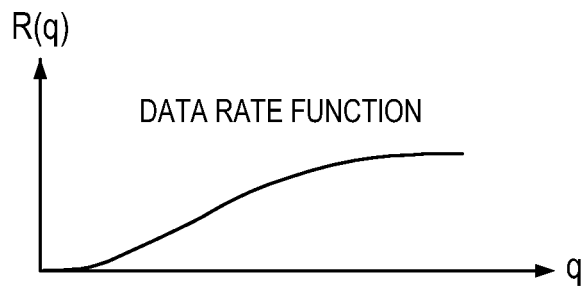
FIG. 4 illustrates an example data rate function, $R(q)$.

The channel availability in time, (1−utilization), could be used to predict the throughput available, by multiplying by the UE-specific instantaneous data rate prediction, R(qu), where qu is a measured value of the UL RSSI, as shown in equation (10) below. An example data rate function, R(q), is shown in FIG. 4.

$$\text{Throughput}(qu) \sim = R(qu) \times (1-\text{utilization}) \times k \qquad \text{equation (10)}$$

However, in a WLAN, it is difficult to predict the amount of channel time that could be used by a newly arriving UE, since channel time is shared in a distributed fashion between all overlapping stations and APs in accordance with the collision avoidance algorithm.

To use this method, one could assume the percentage of the available time that could be used by the newly arriving UE. In the equation above, this percentage is shown as the factor k. The factor k also accounts for effects such as retransmissions and collisions.

For example, if the predicted DL transmission rate is 26 Mbps (R(qu)=26 Mbps), and the channel is estimated to be utilized 75% of the time (utilization=0.75), and one assumes that the new UE can consume half of the idle time (k=0.5), one can predict the DL throughput to be:

Throughput~=26 Mbps×(1−0.75)×0.5=3.3 Mbps.

There is a significant chance for error in this method, since it assumes that:

The new UE will defer its transmissions until the channel is idle; statistically, data bursts to the new UE would be expected to sometimes occur at the same time as the pre-existing traffic, and thereby lower the perceived throughput of all stations.

The transmissions from other contending stations will not change significantly; however, the amount of channel time that the new UE can consume is dependent on how many stations contend for the channel simultaneously. For example, if the channel is fully occupied by one station, the new (second) UE will actually be able to access about 50% of the channel time (assuming both stations have traffic of the same class of service) since the collision avoidance mechanism in 802.11 causes the 2 stations to each transmit about the same rate of frames, i.e., the first UE's frame rate will be cut in half, and the second UE's frame rate will be equal to that.

Frame errors caused by bursty interference sources are infrequent. If there are bursty error sources that interfere after the AP starts transmitting, this degrades the frame error rate, and may cause the rate adaptation algorithm to use a lower transmission rate.

Weighted Average UE DL Throughput

Perhaps a better prediction of the DL throughput that could be realized by a UE is given by the average UE DL throughput measured recently in the BSS. To account for the instantaneous channel condition of the UE, one could weight this average DL throughput by a factor based on the UE's current data rate relative to the average data rate in the BSS, i.e.:

Throughput(qu)~=R(qu)×(Tb/Rb)     equation (11)

where:

R(qu) is the predicted DL data rate for a UE "u" based on the UL RSSI, qu, measured at the AP, i.e., this is a UE-specific DL data rate prediction;

Rb is the predicted DL data rate averaged over all UEs in the BSS, i.e., this is the average DL data rate; and Tb is the average UE DL throughput of the UEs in the BSS considering only periods when there is DL data queued to send to a given UE.

Note that the observation interval index, I, has been dropped from the notation for simplicity, as it is understood that the DL throughput estimates apply to a particular observation interval. Tb is measured over the UEs that were recently active in the BSS, and therefore represents an average over the channel conditions at their locations in the BSS. The average data rate over these locations, Rb, could be calculated from the R(q) data rate function as:

$Rb \approx \Sigma_q p(q) \times R(q)$     equation (12)

where q is the measured UL RSSI, and p(q) is the probability of RSSI value, q.

To calculate p(q), a histogram, P(q), of RSSI values could be collected and normalized to get the quantized probability density function, p(q):

$$p(q) \approx \frac{P(q)}{\sum_q P(q)}$$     equation (13)

We can substitute equation 12 into equation 11 to get a practical way of calculating Rb:

$$Rb \approx \frac{\sum_q P(q) \times R(q)}{\sum_q P(q)}$$     equation (14)

Figure 5A:
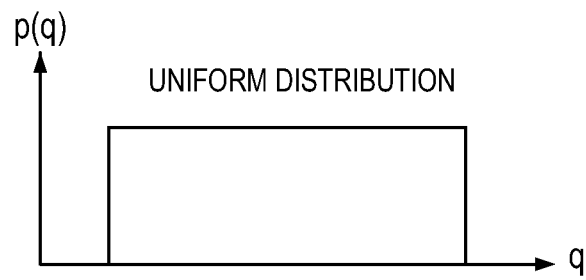
FIGS. 5A-C illustrate a plurality of possible RSSI probability density functions, p(q).
Figure 5B:
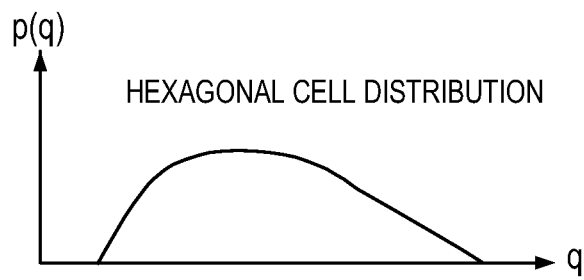
Figure 5C:
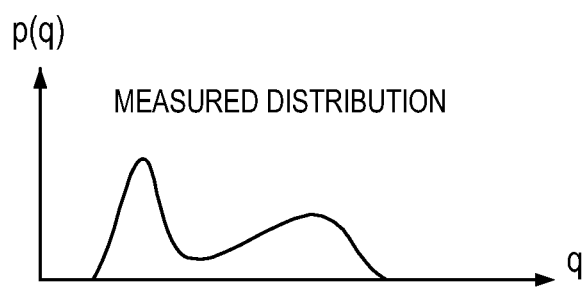
Figure 6:
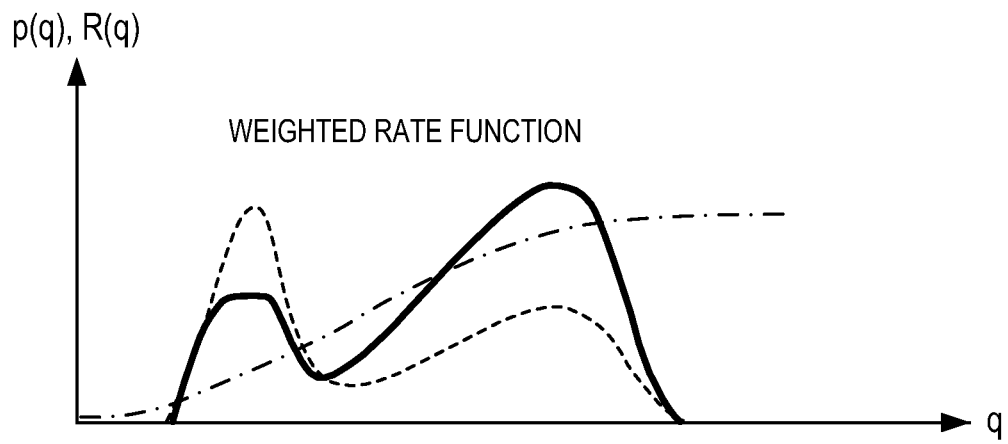
FIG. 6 illustrates an example weighted rate function.

FIGS. 5A-C illustrate a plurality of possible RSSI probability density functions, p(q), and FIG. 6 illustrates an example weighted data rate function p(q)×R(q) in which the probability density function p(q) has been applied to the function R(q). As shown in FIGS. 5A-C, p(q) could be approximated by a uniform distribution over a range of RSSI values (FIG. 5A), so that Rb just becomes a constant. Alternatively, p(q) could be determined a priori from an assumed cell shape, such as a hexagonal cell (FIG. 5B), and path loss geometry, along with an assumption of uniformly distributed clients in the cell. A better method could be to measure p(q) actively at the AP by collecting a histogram, P(q), of the RSSI values over the same measurement period that is used to measure the average UE DL throughput, Tb (FIG. 5C). By measuring p(q) actively, one can correct Tb when the distribution of UEs is not uniform in the coverage area.

Figure 7:
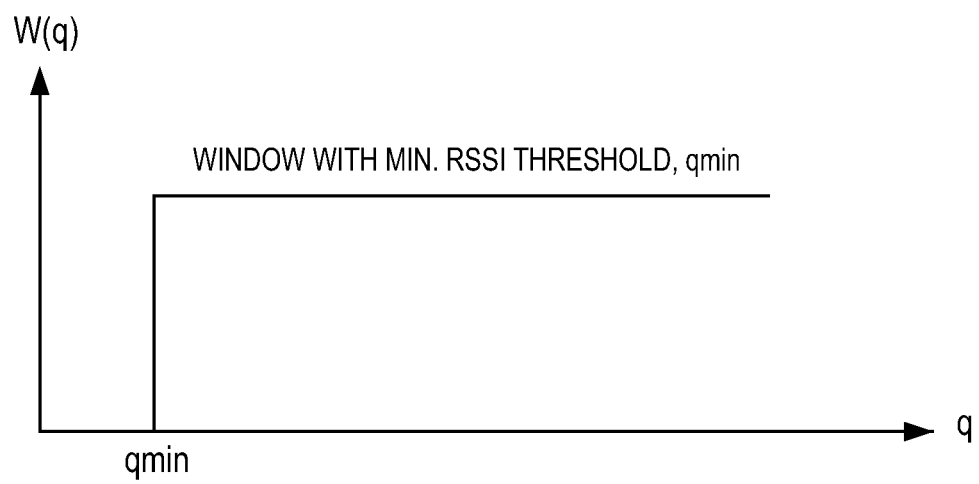
FIG. 7 illustrates an example window function to cut off low data rates

As a final enhancement, a window function, W(q), could be applied to the data rate function, R(q), in order to remove DL throughput predictions below some threshold value of RSSI. An example window function that cuts off low data rates is shown in FIG. 7. Applying the window function W(q), the DL throughput prediction then becomes:

Throughput(qu)~=R(qu)×((Tb/Rb)×W(qu))     equation (15)

Prediction Using the Weighted Average Bit Duration

In the previous section (entitled "Weighted Average UE DL Throughput"), the term Rb is calculated as the expected value of the DL data rate per frame. In contrast, the DL throughput term Tb is calculated as the ratio of the number of bits transmitted to the sum of the bit durations, i.e., the average DL throughput per bit, rather than the average data rate per frame. Thus to avoid inconsistencies between the Rb and Tb terms, a better formulation of Rb can be based on the expected value of the bit duration, rather than the expected value of the data rate. To do this, a small change could be made to the previous equation, as follows:

$$Rb' \approx \frac{1}{\sum_q p(q) * (1/R(q))}$$     equation (16)

where:

q is the RSSI, and p(q) is the probability of RSSI value, q.

By again using equation 2 to substitute for p(q), we get the more practical form:

$$Rb' \approx \frac{\sum_q P(q)}{\sum_q P(q)*(1/R(q))} \quad \text{equation (17)}$$

Or, inverting the equation, we get the expected bit duration:

$$Db' = 1/Rb \approx \frac{\sum_q P(q)*(1/R(q))}{\sum_q P(q)} \quad \text{equation (18)}$$

In some embodiments, the term 1/R(q) could be precomputed as a look-up table, rather than performing a division operation. The DL throughput prediction can now be written as:

$$\text{Throughput}(qu) \sim = R(qu) \times Tb \times Db' \quad \text{equation (19)}$$

If the optional window function is applied, then the DL throughput prediction could be written as:

$$\text{Throughput}(qu) \sim = R(qu) \times Tb \times Db' \times W(q) \quad \text{equation (20)}$$

Here the division by Rb has been replaced by a simpler multiplication by Db'.

Summary of Prediction Methods

The following list summarizes the proposed DL throughput prediction methods, in order of increasing complexity.

1. UE DL Throughput Averaged Over all UEs in the BSS, Tb

This prediction is not UE specific, but may be a fallback in the absence of other measurements. Accuracy could be increased by using timestamps and bit counters, as discussed above.

2. UE-Specific Instantaneous Data Rate Prediction, R(Gu)

Function R(q) maps the UE specific RSSI, qu, to a predicted instantaneous DL data rate, R(qu), ignoring contention and interference. This predictor ignores BSS loading.

3. R(qu)×(1−utilization)×k

Since channel time is shared in a distributed way between all overlapping stations and APs, this method is not accurate. It also ignores the impact of noise below the clear channel assessment threshold, i.e., noise that does not show up as channel utilization.

4. R(qu)×(Tb/Rb) (See FIGS. 8-9, and Equation (11) Above)

In this method, the utilization is replaced by the UE average DL throughput measurement, Tb, and is normalized by the average data rate in the BSS, Rb.

5. R(qu)×((Tb/Rb)×W(qu)) (See FIGS. 8-9, and Equation (15) Above)

This extends the previous method by adding a window function, W(q), that excludes low rate DL throughput predictions.

6. R(qu)×(Tb×Db') (See FIGS. 8 and 10, and Equation (19) Above)

This improves method 4 above by replacing the average data rate term, Rb, with an average bit duration term, Db'.

7. R(qu)×((Tb×Db')×W(qu)) (See FIGS. 8 and 10, and Equation (20) Above)

This extends method 6 by adding a window function, W(q), that excludes low rate DL throughput predictions.

Methods 4-7 are described in FIGS. 8-10, which are discussed below in greater detail.

In some instances, method 7 may provide the most accurate prediction of DL throughput for a specific UE of all the methods listed above.

A generalized form of the DL throughput prediction algorithm is given by:

$$\text{Throughput}(qu) = R(qu) \times F(q) \quad \text{equation (19)}$$

where F(q) is a weighting function on the basic RSSI to data rate function R(q).

F(q) can take various embodiments, such as:
- A constant (the prediction then degenerates to the basic RSSI to data rate function of method 2),
- Tb/Rb, as in method 4,
- (Tb/Rb)×W(qu), as in method 5,
- Tb×Db', as in method 6, and
- Tb×Db'×W(qu), as in method 7.

Figure 8:
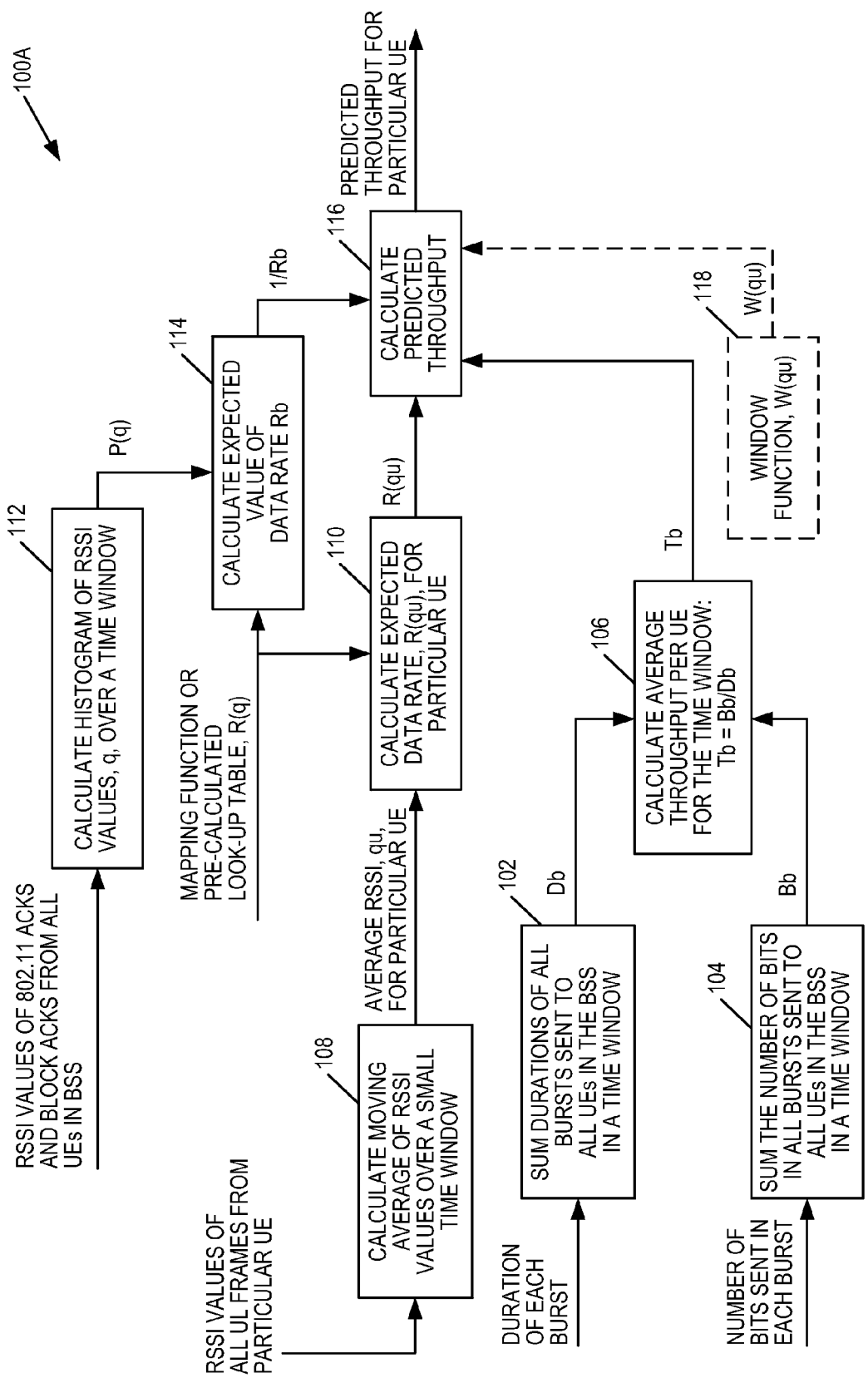
FIG. 8 is a flowchart illustrating an example method of predicting UE DL throughput in a BSS.

FIG. 8 illustrates a flowchart 100A in which methods 4 or 5 discussed above are applied (depending on whether optional window function of block 118 is applied). Thus, the flowchart either omits the window function of block 118 (in which case method 4 and equation (11) above are applied), or includes the window function of block 118 (in which case the method 5 and equation (15) above are applied). Equations (11) and (15) are restated below for convenience.

$$\text{Method 4: Throughput}(qu) \sim = R(qu) \times (Tb/Rb) \quad \text{equation (11)}$$

$$\text{Method 5: Throughput}(qu) \sim = R(qu) \times ((Tb/Rb) \times W(qu)) \quad \text{equation (15)}$$

FIG. 8 shows how each of the terms of these equations can be determined. Tb will be discussed first. A sum of burst durations is determined over all DL bursts transmitted from the AP 24 to a plurality of UEs 26 in the BSS 24 (e.g., all UEs in the BSS) during a time window (block 102) ("first time window"), which yields Db. A sum is also determined of the number of bits in each of those DL bursts sent to the plurality of UEs 26 in the BSS 24 (e.g., all of the UEs in the BSS) during the same time window (block 104), which yields Bb. An average UE DL throughput among the plurality of UEs in the BSS 24 (e.g., all of the UEs in the BSS) is calculated for the time window (block 106), using equation (7) above, which yields Tb. In some embodiments, time window that is used in blocks 102, 104 may be on the order of 100 seconds, for example. Although FIG. 8 shows "the plurality of UEs" in blocks 102, 104 as including all UEs in the BSS, it is understood that some UEs could be omitted, such that the plurality of UEs for these blocks did not include all UEs in the BSS.

The term R(qu) will now be discussed (which is the output of block 110). A moving average of signal qualities (e.g., RSSI values) over a first time window is calculated (block 108) for a first set of uplink transmissions which are sent from a particular UE 26 "u" to the AP 24 (see input to block 108). The output of block 108 is an average signal quality, qu, for the particular UE "u". FIG. 8 indicates that the signal qualities may be RSSI values. Thus, in some embodiments, the signal quality is a RSSI value (as RSSI may be an estimate of SNR, rather than an estimate of absolute signal strength). Optionally, the moving average of block 108 may be time-weighted.

Based on the calculated moving average, qu, an expected data rate, R(qu), for the particular UE "u" is calculated based on a data rate function that maps signal quality values to DL data rates, or a corresponding look-up table. The data rate function may be expressed as a pre-calculated look-up table, for example. The expected data rate (e.g., bit rate) is then utilized as R(qu) for method 4 or 5 above.

The term 1/Rb will now be discussed. Based on a second set up uplink transmissions, which include 802.11 ACKs and/or block ACKs from a plurality of UEs 26 in the BSS 24 (e.g., all UEs in the BSS), a histogram of RSSI values, q, over a time window ("second time window") is determined (block 112), which yields P(q). Although FIG. 8 shows "the plurality of UEs" which provide input to block 112 as including all UEs in the BSS, it is understood that some UEs could be omitted, such that the plurality of UEs for these blocks did not include all UEs in the BSS.

An expected value of data rate Rb is then calculated based on P(q) and the data rate function or look-up table (block 114), which yields the term 1/Rb. The DL throughput may then be calculated based on equation (11) above, using R(qu), Tb, and Rb. Optionally, window function W(q) (block 118) may be applied to exclude UL transmissions having a signal quality below a predefined threshold from the first set of uplink transmissions.

Figure 9:
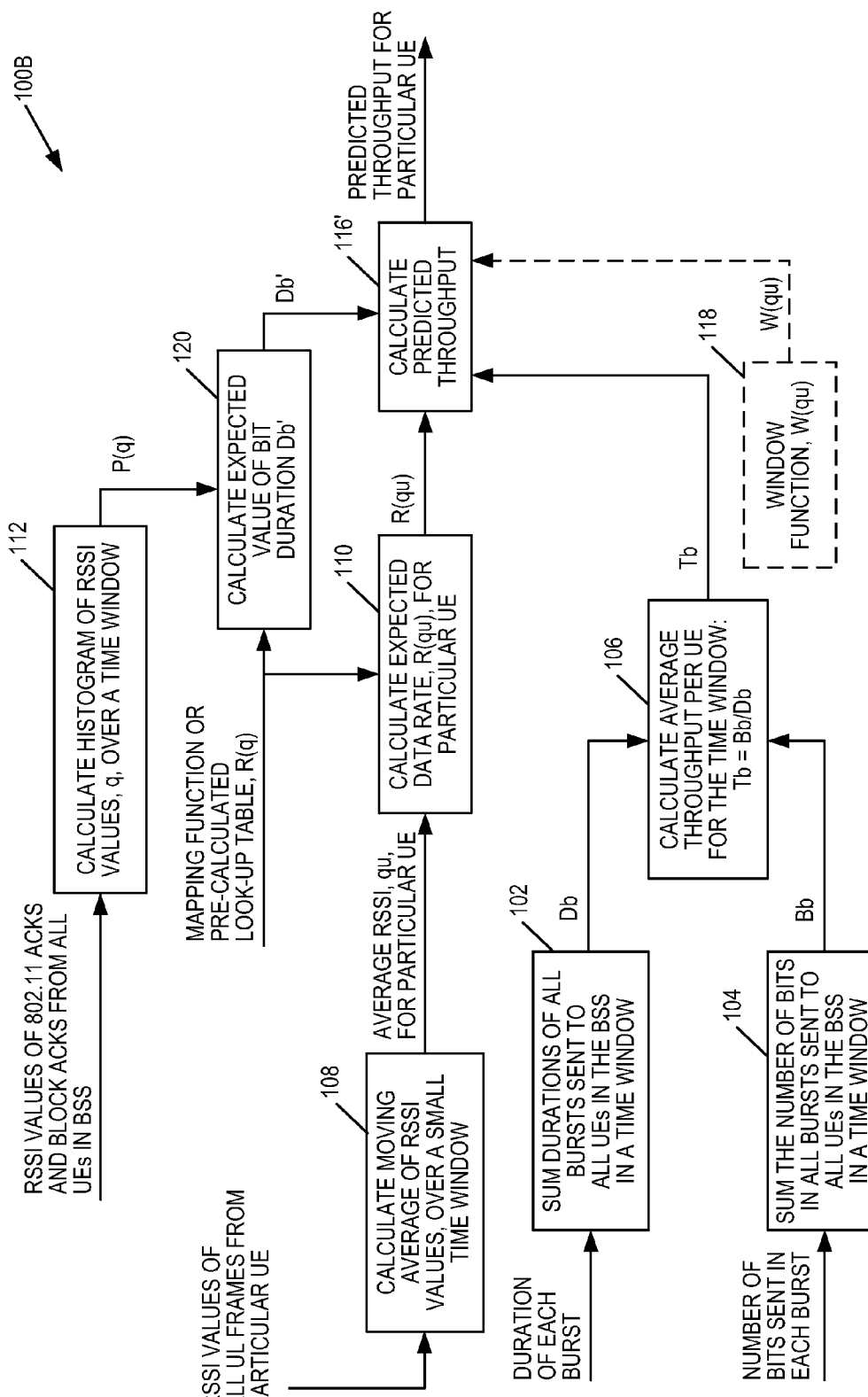
FIG. 9 is a flowchart illustrating another example method of predicting UE DL throughput in a BSS.

FIG. 9 illustrates a method 100B which in which methods 6 or 7 discussed above are applied (depending on whether the optional window function of block 118 is applied). Thus, the flowchart either omits the window function of block 118 (in which case method 6 and equation (19) above are applied), or includes the window function of block 118 (in which case the method 7 and equation (20) above is applied). Equations (19) and (20) are restated below for convenience.

Method 6: Throughput($qu$)~=$R(qu) \times Tb \times Db'$     equation (19)

Method 7: Throughput($qu$)~=$R(qu) \times Tb \times Db' \times W(qu)$     equation (20)

Blocks 102-112 are the same in FIG. 9 as they are in FIG. 8. However, in FIG. 9 block 120 replaces block 114, such that an expected bit duration Db' is calculated instead of calculating an expected data rate Rb. In block 116', UE DL throughput is calculated based on equation (19) above using R(qu), Tb, and Db'. Optionally, window function W(q) (block 118) may be applied to exclude UL transmissions having a signal quality below a predefined threshold from the first set of uplink transmissions.

Figure 10:
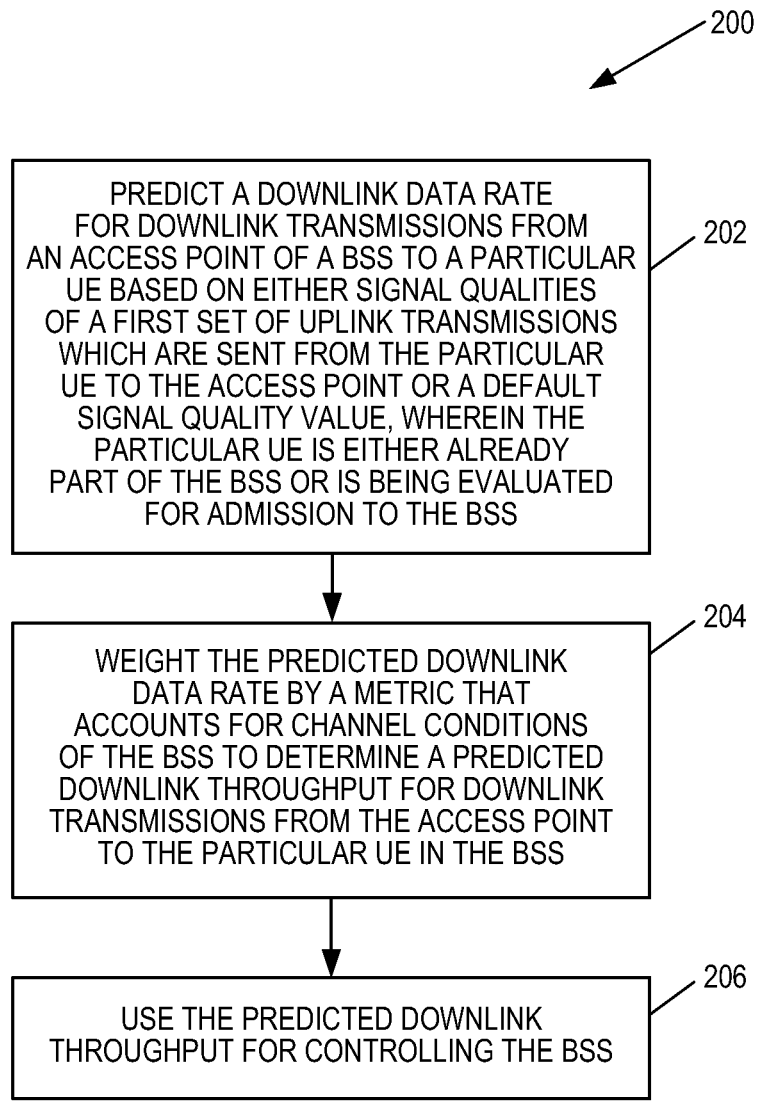
FIG. 10 illustrates a method that incorporates aspects of FIGS. 8-9.

FIG. 10 illustrates an example method 200 that is a broader formulation of the methods 100A, 100B. The method 200 is implemented by a network node in relation to a BSS 24 that includes an access point 22 providing a WLAN, and includes a particular UE 26 that is either part of the BSS 24, or is being evaluated for admission to the BSS 24. The network node implementing method 100 could be the WLAN AP 22, or the central controller 30, or any control or data forwarding node in the network 20, for example. According to the method 200, the network node predicts (block 202) a DL data rate for DL transmissions from the access point 22 to the particular UE 26 based on either signal qualities of a first set of uplink transmissions which are sent from the particular UE 26 to the access point 22 (e.g., R(qu)) or a default signal quality value.

The network node weights the predicted DL data rate (block 204) by a metric that accounts for channel conditions of the BSS 24 to determine a predicted DL throughput for DL transmissions from the AP 22 to the particular UE 26. That metric may be based on Tb/Rb (as in methods 4-5 above) or TB×Db' (as in methods 6-7 above), for example. The network node then uses the predicted DL throughput for controlling the BSS 24 (block 206).

In some embodiments, controlling the BSS (block 206) comprises changing a connectivity of the particular UE with respect to the BSS. This could include admission control, traffic overload control, and/or mobility control (e.g., load balancing), for example. In some embodiments, controlling the BSS comprises performing performance monitoring of the network (e.g., for longer term changes that are implemented after the particular UE is no longer connected and/or no longer trying connect to the BSS).

The metric that accounts for channel conditions of the BSS 24 may be based on an average UE DL throughput of DL transmissions from the access point 22 to a plurality of respective UEs 26 in the BSS 244 (e.g., Tb). In some such embodiments, the average UE DL throughput among the plurality of UEs in the BSS is calculated based on a duration of each of a plurality of DL bursts transmitted from the access point to the plurality of UEs 26, and a quantity of bits transmitted in each of the plurality of DL bursts (e.g., as shown in block 106).

In some embodiments of the method 200, the weighting of the predicted DL data rate by the metric that accounts for channel conditions of the BSS is performed as a function of an additional DL data rate (e.g., Rb) which is based on signal qualities of a second set of uplink transmissions which are sent from a plurality of UEs in the BSS to the AP 24 (see, e.g., block 114).

In some such embodiments, the weighting of the predicted DL data rate by a metric that accounts for channel conditions of the BSS is performed according to equation (11), which is reproduced below.

$$\text{Throughput}(qu) = \frac{R(qu) \times Tb}{Rb} \qquad \text{equation (11)}$$

According to such embodiments:
  qu is a signal quality of a given uplink transmission, or a set of uplink transmissions over a time window from the particular UE "u";
  R(qu) is the predicted DL data rate for DL transmissions from the access point to the particular UE which is based on either the signal quality of the first set of uplink transmissions or the default signal quality value;
  Tb is the average UE DL throughput of DL transmissions from the access point to a plurality of respective UEs in the BSS; and
  Rb is the additional DL data rate that is based on a signal quality of the second set of uplink transmissions; and
In such embodiments, Rb is calculated according to the equation (14), which is reproduced below.

$$Rb = \frac{\sum_q P(q) \times R(q)}{\sum_q P(q)} \qquad \text{equation (14)}$$

According to such embodiments, P(q) is a histogram of signal quality values of the second set of uplink transmissions, and R(q) is a mapping function or look-up table that maps signal quality values to downlink data rates.

In some embodiments (e.g., that of FIG. 9), the weighting of the predicted DL data rate by the metric that accounts for channel conditions of the BSS is performed as a function of an expected DL bit duration (e.g., Db') which is based on a signal quality of the second set of uplink transmissions which are sent from a plurality of UEs in the BSS to the access point.

In some such embodiments, the weighting of the DL data rate by a metric that accounts for channel conditions of the BSS is performed according to equation (19), which is reproduced below:

$$\text{Throughput}(qu) = R(qu) \times Tb \times Db' \quad \text{equation (19)}$$

In such embodiments:
qu is a signal quality of a given uplink transmission, or of a set of uplink transmissions over a time window from the particular UE "u";
R(qu) is the predicted DL data rate for DL transmissions from the access point to the particular UE "u" which is based on either the signal quality of the first set of uplink transmissions or the default signal quality value;
Tb is the average UE DL throughput of DL transmissions from the access point to a plurality of respective UEs in the BSS;
Db' is the expected DL bit duration; and
In such embodiments, Db' is calculated according to the equation (18), which is reproduced below:

$$Db' = \frac{\sum_q P(q) * (1/R(q))}{\sum_q P(q)}$$

In this equation, P(q) is a histogram of signal quality values of the second set of uplink transmissions, and R(q) is a mapping function or look-up table that maps signal quality values to downlink data rates.

As discussed above, R(q) may be determined based on a mapping function or look-up table that maps signal quality values to DL data rates.

The "first set of uplink transmissions" discussed above (e.g., the input to block 108 in FIGS. 8-9), are received from the particular UE over a first time window, and the second set of uplink transmissions (e.g., the input to block 112 in FIGS. 8-9) are received from a plurality of UEs in the BSS (e.g., all UEs in the BSS) over a second time window. In some embodiments, the second time window is longer than the first time window. In some embodiments, the only uplink transmissions that are included in the second set of uplink transmissions are acknowledgment (ACK) and/or block ACK transmissions sent in response to the DL transmissions that were used to measure the average UE downlink throughput, Tb.

In any of the embodiments discussed above, window function W(q) may optionally be applied to exclude uplink transmissions having a signal quality below a predefined threshold from the first set of uplink transmissions.

In some embodiments, said predicting a DL data rate for DL transmissions from the AP 22 to the particular UE 26 based on a signal quality of the first set of uplink transmissions includes calculating a moving average of signal quality values of the first set of uplink transmissions (block 106), and predicting the DL data rate for the particular UE based on the calculated moving average and a mapping function that maps signal quality values to data rates (block 116).

Figure 11:
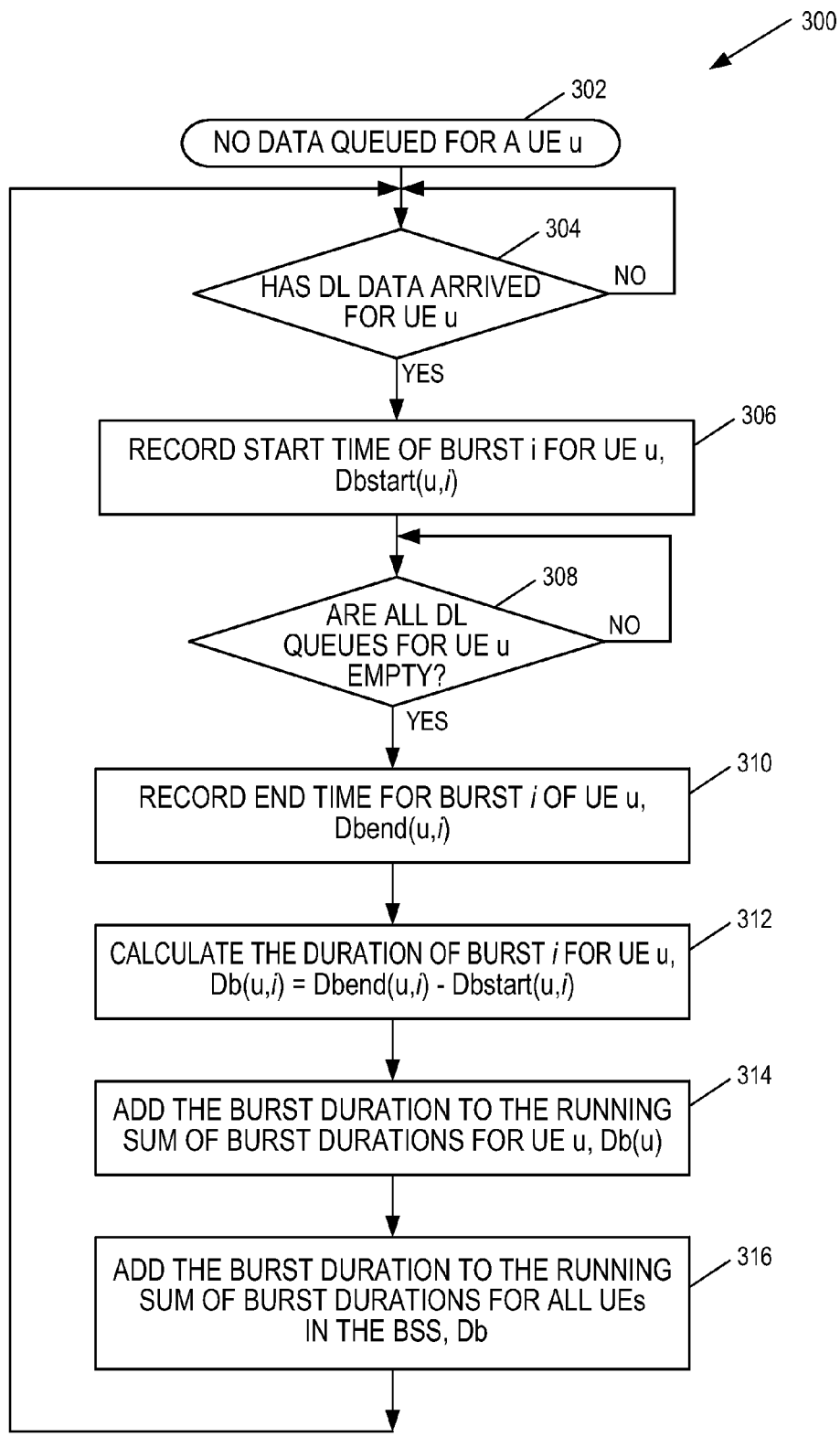
FIG. 11 is a flowchart illustrating an example implementation of block 102 of FIGS. 8-9.

FIG. 11 is a flowchart 300 illustrating one embodiment of block 102 in FIGS. 8-9, for measuring the sum of burst durations of an individual UE within a BSS, Db(u), and then summing the burst durations over all UEs in the BSS to get Db. At block 302, no data is queued for a UE 26, that will be referred to as UE "u". If DL data arrives for the UE "u" (a "Yes" to block 304), then a start time of a burst i for UE "u" is recorded, denoted Dbstart(u,i) (block 306). Once all DL queues for UE "u" are empty (a "Yes" to block 308), an end time for burst i of UE "u" is recorded, denoted Dbend(u,i) (block 310). A duration of the burst i is calculated based on a difference between Dbend(u,i) and Dbstart(u,i) (block 312). The burst duration, Db(u,i), is added to a running sum of burst durations for UE u, denoted Db(u) (block 314). The running sum of burst durations, Db(u), is then added to a running sum of burst durations for all UEs in the BSS, denoted Db (block 316).

Figure 12:
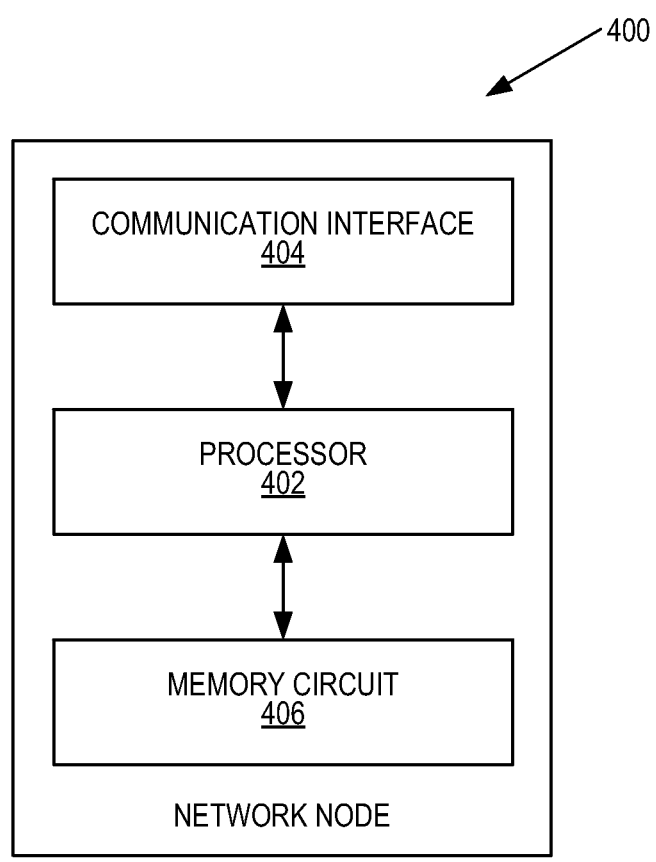
FIG. 12 illustrates an example network node.

FIG. 12 illustrates an example network node 400 that may be configured to implement one or more of the techniques described above. The network node may be an AP 22, may be a WLAN control node 30 (e.g., a WLAN access controller), or any control or data forwarding node in the network 20, for example. The network node 400 includes one or more processing circuits (shown as "processor" 402), a communication interface 404, and a memory circuit 406. The one or more processing circuits are communicatively connected to both the communication interface 404 and the memory circuit 406.

The one or more processing circuits 402 may include, for example, one or more microprocessors, microcontrollers, digital signal processors, or the like, configured with appropriate software and/or firmware to carry out one or more of the techniques discussed above. The memory circuit 408 may comprise one or several types of memory such as read-only memory (ROM), random-access memory, cache memory, flash memory devices, optical storage devices, etc. The memory circuit 408 includes program instructions for predicting a UE DL throughput in a BSS according to one or more of the techniques described herein. The communication interface may comprise a WLAN transceiver, for example.

The one or more processing circuits 402 are configured to predict a DL data rate for DL transmissions from an AP 22 to a particular UE 26 based on either signal qualities of a first set of uplink transmissions which are sent from the particular UE 26 to the AP or a default signal quality value. The access point provides a WLAN and is part of the BSS. The particular UE 26 is either already part of the basic service set (BSS) 24 or is being evaluated for admission to the BSS 24. The one or more processing circuits are further configured to weight the predicted DL throughput for DL transmissions from the AP to the particular UE in the BSS, and use the predicted DL throughput to control the BSS.

In some embodiments, processing operations are split between the AP 22 and a WLAN control entity (e.g., the WLAN control node 30 or any control or data forwarding node in the network 20). This may be done such that the AP 22 performs the processing with the tightest real-time constraints, while the WLAN control entity performs the processing with looser real-time constraints. For example, in one embodiment the AP 22 would measure the following items and report them to the WLAN control entity:
the burst duration counters, Db(u) and Db,
the burst bit counters, Bb(u) and Bb,
the RSSI values from all UEs, and then calculate the RSSI histogram, P(q) (block 112), and
the RSSI values from the particular UE, for which we want to predict DL throughput, and calculation of the average RSSI for the particular UE (block 108).
The WLAN control entity would then:
calculate the expected data rate (e.g., bit rate) R(qu), for the particular UE (block 110),
calculate Rb or Db' (block 114 or 120),
calculate Tb (block 106), and calculate the predicted DL throughput (block 116).

The predicted DL throughput could be used for many possible use cases, including:
- admission control of a UE to an AP, possibly with a dependence on the desired Quality of Service (QoS) of the UE,
- overload control at an AP, where one wishes to select a UE to disassociate to limit load,
- handover control of a UE between frequency bands of the same AP,
- handover control of a UE between APs, and
- handover control of a UE between an AP and a cellular network (either direction).

In other embodiments, the AP 22 may perform the actions described in FIG. 8 or 9, instead of relying on the WLAN control entity to do so. The WLAN control entity could be a variety of different nodes, such as WLAN control node 30, or any control or data forwarding node in the network 20.

According to another aspect of the present disclosure, a computer program product is stored in a non-transitory computer-readable medium (e.g., memory circuit 406) for controlling a BSS (24). The computer program product comprises software instructions which, when run by processor (402) in network node (400), configures the network node (400) to:
- predict a downlink data rate for downlink transmissions from access point (22) to a particular UE (26) based on either signal qualities of a first set of uplink transmissions which are sent from the particular UE (26) to the access point (22) or a default signal quality value, wherein the access point (22) provides a Wireless Local Area Network (WLAN) and is part of the BSS (24), and wherein the particular UE (26) is either already part of the BSS (24) or is being evaluated for admission to the BSS (24);
- weight the predicted downlink data rate by a metric that accounts for channel conditions of the BSS (24) to determine a predicted downlink throughput for downlink transmissions from the access point (22) to the particular UE (26) in the BSS (24); and
- use the predicted downlink throughput to control the BSS (24).

In some embodiments, the computer program product may further configure the network node to implement any combination of the techniques discussed above.

UE Specific DL Throughput Prediction While Active

In FIGS. 8-9 above, block 108 describes calculation of a moving average of signal qualities (e.g., RSSI values) for a UE "u", to be used as a basis for determining the UE's average signal quality "qu". If the particular UE 26 for which a DL throughput estimate is desired is actively moving, the following options for determining "qu" may be desirable:

(A) Same as method 7 above. If the UE has not received DL traffic recently, the AP 22 will not have a recent estimate of the UE's UL RSSI. In that case, a default conservative (low) value of RSSI could be used until UL RSSI measurements are again available.

(B) Measurement of the individual UE's DL throughput, in a manner similar to the average UE DL throughput measurement, but averaging only over the data bursts of the individual UE. This would require additional memory to store the individual UE measurements of timestamps, $Db(u, l)$, and bit counters, $Bb(u,l)$, plus a small amount of additional processing load to calculate the DL throughput whenever needed, i.e., the ratio of the bit counter to the accumulated time. One could switch between options (A) and (B), so that option (A) is used prior to the UE 26 exchanging a significant amount of user plane traffic, while option (B) is used after that. This option (B) will be inaccurate if the UE has not received DL traffic recently, but the BSS loading or interference condition has changed recently.

Of these, option (A) may be superior, since it is sensitive to changes in BSS loading and interference, and it should also provide more consistent predictions when compared with the predictions prior to the UE entering the BSS.

Histogram Counting

In some embodiments, when collecting the histogram, $P(q)$, the AP counts only the ACK or Block ACK control frames that the AP receives in response to DL frame transmissions. In some embodiments, the DL frame transmissions satisfy the following criteria:
- the DL frame type is either data or management, not control,
- the frame sub type requires an ACK, i.e., do not include frames that include with a No-ACK sub type, and
- the destination address is unicast (not broadcast).

The reason for counting ACKs to these specific DL frames is that they occur closely in time to (right after) the DL frames that are being collected for the DL UE DL throughput estimate, Tb.

In cases where multiple DL data frames are transported in an aggregate MPDU, the Block ACK should be counted multiple times per aggregate MPDU according to the number of frames that are acknowledged successfully by the Block ACK.

RSSI Measurement and Filtering

When measuring the RSSI, qu, for use in the $R(q)$ function, several RSSI values should be averaged to improve the estimate. The RSSI values should be close in time to avoid averaging over more than the period of slow fading, while still averaging over the period of fast fading. These time scales are band specific.

When the UE is attempting to associate with the BSS, several frames are exchanged with the AP before the network makes a decision on whether to admit the UE. Thus the RSSI measurements of these frames could be averaged. Consideration can then be given to what sort of weighting function should be applied to the historical RSSI samples.

One simple form of weighting is the exponentially weighted moving average, which behaves similarly to a single-stage, low-pass infinite impulse response (IIR) digital filter when the samples are equally spaced in time. The averaging function is defined as:

$$y(n)=a*x(n)+(1-a)*y(n-1) \qquad \text{equation (21)}$$

where:
- $y(n)$ and $y(n-1)$ are the current and previous RSSI estimates (output),
- $x(n)$ is the current RSSI measurement (input),
- a is the filter coefficient that determines how quickly older inputs are unweighted, and
- $y(0)=x(0)$.

The filter coefficient, a, should be chosen based on the expected time between samples. However, the exchange of MAC frames is fairly erratic in time.

A time dependent, rather than event dependent, weighting function may be superior. Such a weighting function could be formed in a fashion similar to an FIR digital low-pass filter, as follows:

$$y(t) = \frac{\sum_{t_k} w(t - t_k) * x(t_k)}{\sum_{t_k} w(t - t_k)} \quad \text{equation (22)}$$

where:
y(t) is the time averaged estimate of the RSSI at time t,
w(t) is a weighting function,
$x(t_k)$ is the sample of the RSSI taken at time $t_k$, and
$t_k$ is time bounded to the range t to (t−T)

The weighting function, w(t), should be selected to give higher weight to more recent samples, and less weight to older samples. A suitable weighting function could be a negative exponential:

$$w(t) = \exp(-t/t_0) \quad \text{equation (23)}$$

The value $t_0$ determines the rate of decay of the exponential. For simplicity of implementation, w(t) could be discretized in time so that only a few values of the weighting function need to be stored.

The coherence time of a Wi-Fi channel is given approximately by:

$$T = 1/(2 * B_{Doppler}) \quad \text{equation (24)}$$

where $B_{Doppler}$ is the Doppler spread of the channel.

Doppler shifts occur when either the Wi-Fi station or a reflector on one or more of the multiple signal propagation paths is moving. The Doppler shift due to a moving station is given by:

$$F_{Doppler} = f * (v/c) \quad \text{equation (25)}$$

where:
f is the carrier frequency,
v is the speed of the station relative to the AP, and
c is the speed of light.

Thus for a person walking at 1 m/s, the Doppler shifts and approximate coherence times for the 2.4 GHz and 5 GHz bands would be:

$$F_{Doppler,2.4} = 2.4e9 * (1/3e8) = 8 \text{ Hz}$$

$$T = 1/(2 * F_{Doppler}) = 63 \text{ ms}$$

$$F_{Doppler,5} = 5e9 * (1/3e8) = 17 \text{ Hz}$$

$$T = 1/(2 * F_{Doppler}) = 30 \text{ ms}$$

Averaging could improve the RSSI estimate in two ways. First, if multiple samples are averaged within less than the coherence time of the channel, the averaging could reduce the error due to thermal noise and other noise sources that are uncorrelated with the channel between the Wi-Fi transmitter and receiver, since the channel response is fairly constant over that duration. Secondly, if samples are averaged over a period much longer than the coherence time, then the averaging will reduce the error due to fast fading, i.e., signal strength changes due to motion of the stations or reflectors.

In a typical scenario where a UE is attempting to associate with an AP, the sequence of frames that are exchanged before deciding on admitting the UE occur over a fairly short time on the order of 100 ms. However there could also be significant delays in responses for some messages, such as the delay in exchanging and processing RADIUS messages with the AAA server during EAP authentication.

Initializing Tb and Db

Prior to transmitting a significant amount of DL data, the estimated average DL throughput, Tb, may be inaccurate. Therefore, it may be desirable to replace Tb by a configured constant value until a threshold amount of DL data is measured.

Similarly, it may be desirable to replace the estimated average bit duration, Db, by a configured constant value until a threshold amount of DL data is measured.

Dual Band Operation

When 2 operating bands are enabled for inter-RAT steering in the Wi-Fi AP, e.g., one BSS in one 2.4 GHz channel and a second BSS in one 5 GHz channel, separate predictions of performance may be used for each BSS. Each BSS will have its own transmit power, propagation conditions, and loading.

Several methods for estimating the DL throughput of a WLAN station have been proposed and investigated. For the scenario where a UE is moving into the BSS coverage area and attempting to associate, the recommended method is to measure the UL RSSI of the initial frames that are received at the AP, and calculate a predicted DL throughput for the UE using equation 20, which is reproduced below:

$$\text{Throughput}(qu) \sim = R(qu) \times Tb \times Db' \times W(qu) \quad \text{equation (20)}$$

where:
Tb is the average UE DL throughput in the cell over the recent past (e.g., 1 minute),
R(qu) is the predicted DL data rate for a UE "u" based on the UL RSSI, qu, measured at the AP (determined using a look-up table or function that maps the measured RSSI, qu, into a DL data rate),
W(q) is an arbitrary window function that can exclude RSSI measurements below some threshold value, and
Db' is the expected value of the bit duration.

It is understood that in some embodiments, the blocks of the flowcharts above may occur out of the order noted in the figures. For example, two blocks shown in succession may, in fact, be executed substantially concurrently, or the blocks may sometimes be executed in the reverse order, depending upon the functionality involved. In FIG. 8, for example, blocks 106, 110, and 114 may occur sequentially, or simultaneously.

The present disclosure may, of course, be carried out in other ways than those specifically set forth herein without departing from essential characteristics of the present disclosure. The present embodiments are to be considered in all respects as illustrative and not restrictive, and all changes coming within the meaning and equivalency range of the appended claims are intended to be embraced therein.

What is claimed is:

1. A method implemented by a network node in relation to a basic service set (BSS) that includes an access point providing a Wireless Local Area Network (WLAN), the method comprising:

predicting a downlink data rate for downlink transmissions from the access point to a particular UE based at least in part on signal qualities of a first set of uplink transmissions which are sent from the particular UE to the access point, wherein the particular UE is either already part of the BSS or is being evaluated for admission to the BSS;

weighting the predicted downlink data rate by a metric that accounts for channel conditions of the BSS to determine a predicted downlink throughput for downlink transmissions from the access point to the particular UE, the metric being based on signal qualities of a second set of uplink transmissions which are sent from a plurality of UEs in the BSS to the access point; and using the predicted downlink throughput for controlling a connectivity of the particular UE with respect to the BSS.

2. The method of claim 1, wherein the metric that accounts for channel conditions of the BSS is further based on an average UE downlink throughput of downlink transmissions from the access point to the plurality of respective UEs in the BSS.

3. The method of claim 2, further comprising calculating the average UE downlink throughput among the plurality of UEs in the BSS based on a duration of each of a plurality of downlink bursts transmitted from the access point to the plurality of UEs, and a quantity of bits transmitted in each of the plurality of downlink bursts.

4. The method of claim 2, wherein the weighting of the predicted downlink data rate by the metric that accounts for channel conditions of the BSS is performed as a function of an additional downlink data rate which is based on the signal qualities of the second set of uplink transmissions which are sent from the plurality of UEs in the BSS to the access point.

5. The method of claim 4, wherein the weighting of the predicted downlink data rate by the metric that accounts for channel conditions of the BSS is performed according to the following equation:

$$\text{Throughput}(qu) = \frac{R(qu) \times Tb}{Rb}$$

where:
qu is a signal quality of a given uplink transmission, or of a set of uplink transmissions over a time window from the particular UE;
R(qu) is the predicted downlink data rate for downlink transmissions from the access point to the particular UE which is based at least in part on the signal qualities of the first set of uplink transmissions;
Tb is the average UE downlink throughput of downlink transmissions from the access point to the plurality of respective UEs in the BSS; and
Rb is the additional downlink data rate that is based on the signal qualities of the second set of uplink transmissions; and
wherein Rb is calculated according to the following equation:

$$Rb = \frac{\sum_q P(q) \times R(q)}{\sum_q P(q)}$$

where:
P(q) is a histogram of signal quality values of the second set of uplink transmissions; and
R(q) is a mapping function or look-up table that maps signal quality values to downlink data rates.

6. The method of claim 5, wherein the only uplink transmissions that are included in the second set of uplink transmissions are acknowledgment (ACK) and/or block ACK transmissions sent in response to the downlink transmissions that were used to measure the average UE downlink throughput, Tb.

7. The method of claim 5, wherein the first set of uplink transmissions are received from the particular UE over a first time window, and the second set of uplink transmissions are received from all UEs in the BSS over a second time window that is longer than the first time window.

8. The method of claim 2, wherein the weighting of the predicted downlink data rate by the metric that accounts for channel conditions of the BSS is performed as a function of an expected downlink bit duration which is based on the signal qualities of the second set of uplink transmissions which are sent from the plurality of UEs in the BSS to the access point.

9. The method of claim 8, wherein the weighting of the downlink data rate by the metric that accounts for channel conditions of the BSS is performed according to the following equation:

$$\text{Throughput}(qu) = R(qu) \times Tb \times Db'$$

where:
qu is a signal quality of a given uplink transmission, or of a set of uplink transmissions over a time window from the particular UE;
R(qu) is the predicted downlink data rate for downlink transmissions from the access point to the particular UE which is based at least in part on the signal qualities of the first set of uplink transmissions;
Tb is the average UE downlink throughput of downlink transmissions from the access point to the plurality of respective UEs in the BSS; and
Db' is the expected downlink bit duration; and
wherein Db' is calculated according to the following equation:

$$Db' = \frac{\sum_q P(q) * (1/R(q))}{\sum_q P(q)}$$

where:
P(q) is a histogram of signal quality values of the second set of uplink transmissions; and
R(q) is a mapping function or look-up table that maps signal quality values to downlink data rates.

10. The method of claim 9, wherein the only uplink transmissions that are included in the second set of uplink transmissions are acknowledgment (ACK) and/or block ACK transmissions sent in response to the downlink transmissions that were used to measure the average UE downlink throughput, Tb.

11. The method of claim 9, wherein the first set of uplink transmissions are received from the particular UE over a first time window, and the second set of uplink transmissions are received from all UEs in the BSS over a second time window that is longer than the first time window.

12. The method of claim 1, further comprising applying a window function to exclude uplink transmissions having a signal quality below a predefined threshold from the first set of uplink transmissions.

13. The method of claim 1, wherein said predicting a downlink data rate for downlink transmissions from the access point to the particular UE based on a signal quality of the first set of uplink transmissions comprises:
calculating a moving average of signal quality values of the first set of uplink transmissions; and predicting the downlink data rate for the particular UE based on the calculated moving average and a mapping function that maps signal quality values to data rates.

14. A network node comprising:
a communication interface; and
one or more processing circuits communicatively connected to the communication interface, and configured to:
predict a downlink data rate for downlink transmissions from an access point to a particular UE based at least in part on signal qualities of a first set of uplink transmissions which are sent from the particular UE to the access point, wherein the access point provides a Wireless Local Area Network (WLAN) and is part of a basic service set (BSS), and wherein the particular UE is either already part of the BSS or is being evaluated for admission to the BSS;
weight the predicted downlink data rate by a metric that accounts for channel conditions of the BSS to determine a predicted downlink throughput for downlink transmissions from the access point to the particular UE in the BSS, the metric being based on signal qualities of a second set of uplink transmissions which are sent from a plurality of UEs in the BSS to the access point; and
use the predicted downlink throughput to control a connectivity of the particular UE with respect to the BSS.

15. The network node of claim 14, wherein the metric that accounts for channel conditions of the BSS is further based on an average UE downlink throughput of downlink transmissions from the access point to the plurality of respective UEs in the BSS.

16. The network node of claim 15, wherein the one or more processing circuits are further configured to calculate the average UE downlink throughput among the plurality of UEs in the BSS based on a duration of each of a plurality of downlink bursts transmitted from the access point to the plurality of UEs, and a quantity of bits transmitted in each of the plurality of downlink bursts.

17. The network node of claim 15, wherein the one or more processing circuits are configured to weight the predicted downlink data rate by the metric that accounts for channel conditions of the BSS as a function of an additional downlink data rate for the particular UE which is based on the signal qualities of the second set of uplink transmissions which are sent from the plurality of UEs in the BSS to the access point.

18. The network node of claim 17, wherein the one or more processing circuits are configured to weight the predicted downlink data rate by the metric that accounts for channel conditions of the BSS according to the following equation:

$$\text{Throughput}(qu) = R(qu) \times Tb \times Rb$$

where:
qu is a signal quality of a given uplink transmission, or a set of uplink transmissions over a time window from the particular UE "u";
R(qu) is the predicted downlink data rate for downlink transmissions from the access point to the particular UE which is based at least in part on the signal qualities of the first set of uplink transmissions;
Tb is the average UE downlink throughput of downlink transmissions from the access point to the plurality of respective UEs in the BSS; and Rb is the additional downlink data rate for the particular UE that is based on the signal qualities of the second set of uplink transmissions; and
wherein Rb is calculated according to the following equation:

$$Rb = \frac{\sum_q P(q)}{\sum_q P(q) \times R(q)}$$

where:
P(q) is a histogram of signal quality values of the second set of uplink transmissions; and
R(q) is a mapping function or look-up table that maps signal quality values to downlink data rates.

19. The network node of claim 18, wherein the only uplink transmissions that are included in the second set of uplink transmissions are acknowledgment (ACK) and/or block ACK transmissions sent in response to the downlink transmissions that were used to measure the average UE downlink throughput, Tb.

20. The network node of claim 18, wherein the first set of uplink transmissions are received over a first time window, and the second set of uplink transmissions are received from all UEs in the BSS over a second time window.

21. The network node of claim 14, wherein the one or more processing circuits are configured to weight the predicted downlink data rate by the metric that accounts for channel conditions of the BSS as a function of an expected downlink bit duration for the particular UE which is based on the signal qualities of the second set of uplink transmissions which are sent from the plurality of UEs in the BSS to the access point.

22. The network node of claim 21, wherein the one or more processing circuits are configured to weight the downlink data rate by the metric that accounts for channel conditions of the BSS according to the following equation:

$$\text{Throughput}(qu) = R(qu) \times Tb \times Db'$$

where:
qu is a signal quality of a given uplink transmission, or a set of uplink transmissions over a time window from the particular UE "u";
R(qu) is the predicted downlink data rate for downlink transmissions from the access point to the particular UE which is based at least in part on the signal qualities of the first set of uplink transmissions;
Tb is the average UE downlink throughput of downlink transmissions from the access point to the plurality of respective UEs in the BSS; and
Db' is the expected downlink bit duration for the particular UE; and
wherein Db' is calculated according to the following equation:

$$Db' = \frac{\sum_q P(q) * (1/R(q))}{\sum_q P(q)}$$

where:
P(q) is a histogram of signal quality values of the second set of uplink transmissions; and R(q) is a mapping function or look-up table that maps signal quality values to downlink data rates.

23. The network node of claim 22, wherein the only uplink transmissions that are included in the second set of uplink transmissions are acknowledgment (ACK) and/or block ACK transmissions sent in response to the downlink transmissions that were used to measure the average UE downlink throughput, Tb.

24. The network node of claim 22, wherein the first set of uplink transmissions are received over a first time window, and the second set of uplink transmissions are received from all UEs in the BSS over a second time window.

25. The network node of claim 14, wherein the one or more processing circuits are further configured to apply a window function to exclude uplink transmissions having a signal quality below a predefined threshold from the first set of uplink transmissions.

26. The network node of claim 14, wherein to predict a downlink data rate for downlink transmissions from the access point to the particular UE based on a signal quality of the first set of uplink transmissions, the one or more processing circuits are configured to:
  calculate a moving average of signal quality values of the first set of uplink transmissions; and
  predict the downlink data rate for the particular UE based on the calculated moving average and a mapping function or lookup table that maps signal quality values to data rates.

27. A computer program product stored in a non-transitory computer-readable medium for controlling a basic service set (BSS), the computer program product comprising software instructions which, when run by a processor in a network node, configures the network node to:
  predict a downlink data rate for downlink transmissions from an access point to a particular UE based at least in part on signal qualities of a first set of uplink transmissions which are sent from the particular UE to the access point, wherein the access point provides a Wireless Local Area Network (WLAN) and is part of the BSS, and wherein the particular UE is either already part of the BSS or is being evaluated for admission to the BSS;
  weight the predicted downlink data rate by a metric that accounts for channel conditions of the BSS to determine a predicted downlink throughput for downlink transmissions from the access point to the particular UE in the BSS, the metric being based on signal qualities of a second set of uplink transmissions which are sent from a plurality of UEs in the BSS to the access point; and
  use the predicted downlink throughput to control a connectivity of the particular UE with respect to the BSS.

* * * * *